United States Patent [19]

Klingenschmitt et al.

[11] Patent Number: 4,675,678
[45] Date of Patent: Jun. 23, 1987

[54] FREQUENCY AGILE RADAR SYSTEM

[75] Inventors: Carl E. Klingenschmitt, Akron; Elmer B. Clausen, Williamsville, both of N.Y.

[73] Assignee: Textron Inc., Providence, R.I.

[21] Appl. No.: 627,556

[22] Filed: Jul. 3, 1984

[51] Int. Cl.[4] .............................................. G01S 13/48
[52] U.S. Cl. ...................................... 342/34; 342/155; 342/157; 342/158; 342/131
[58] Field of Search .................. 343/5 LS, 56 C, 410, 343/7.4, 16 R, 16 M; 342/34, 155, 157, 158

[56] References Cited

U.S. PATENT DOCUMENTS

| 3,174,146 | 3/1965 | Bossler et al. | 343/56 C |
| 3,243,804 | 3/1966 | Smith, Jr. | 343/16 M |
| 4,034,374 | 7/1977 | Kruger | 343/16 R |

Primary Examiner—T. H. Tubbesing
Assistant Examiner—Mark Hellner

Attorney, Agent, or Firm—Bean, Kauffman & Bean

[57] ABSTRACT

A frequency agile radar system allows tracking of non-cooperative targets with high accuracy. The system is particularly useful in an automatic landing system aboard an aircraft carrier. The radar employs an electronically steered planar array antenna system in which a symmetrical pencil beam of 1° beamwidth is steered in $\frac{1}{2}$° steps in a raster scan. A space-stabilized acquisition window allows target acquisition, and target scanning modes are chosen as a function of target range. At far range, target scan is effected by those four beam raster positions which bracket the target whereas when the target is at near range where its cross section is larger than a single beamwidth, the raster is "ballooned" to paint or cover the target fully. The computed track of the target provides a continuing update of autopilot command signals radioed to the target to bring it to and hold it on a selected glideslope which effects the automatic landing.

55 Claims, 22 Drawing Figures

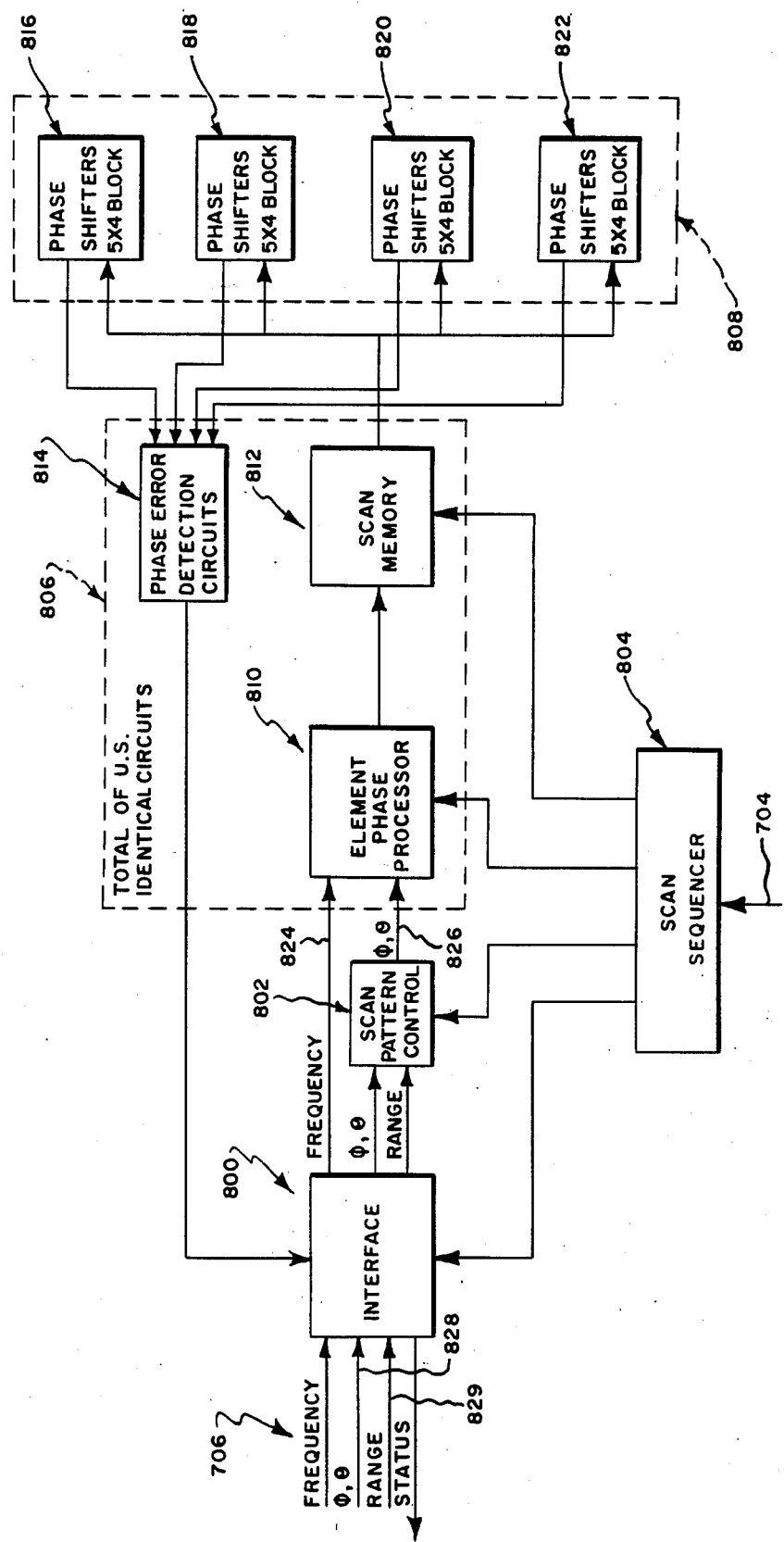

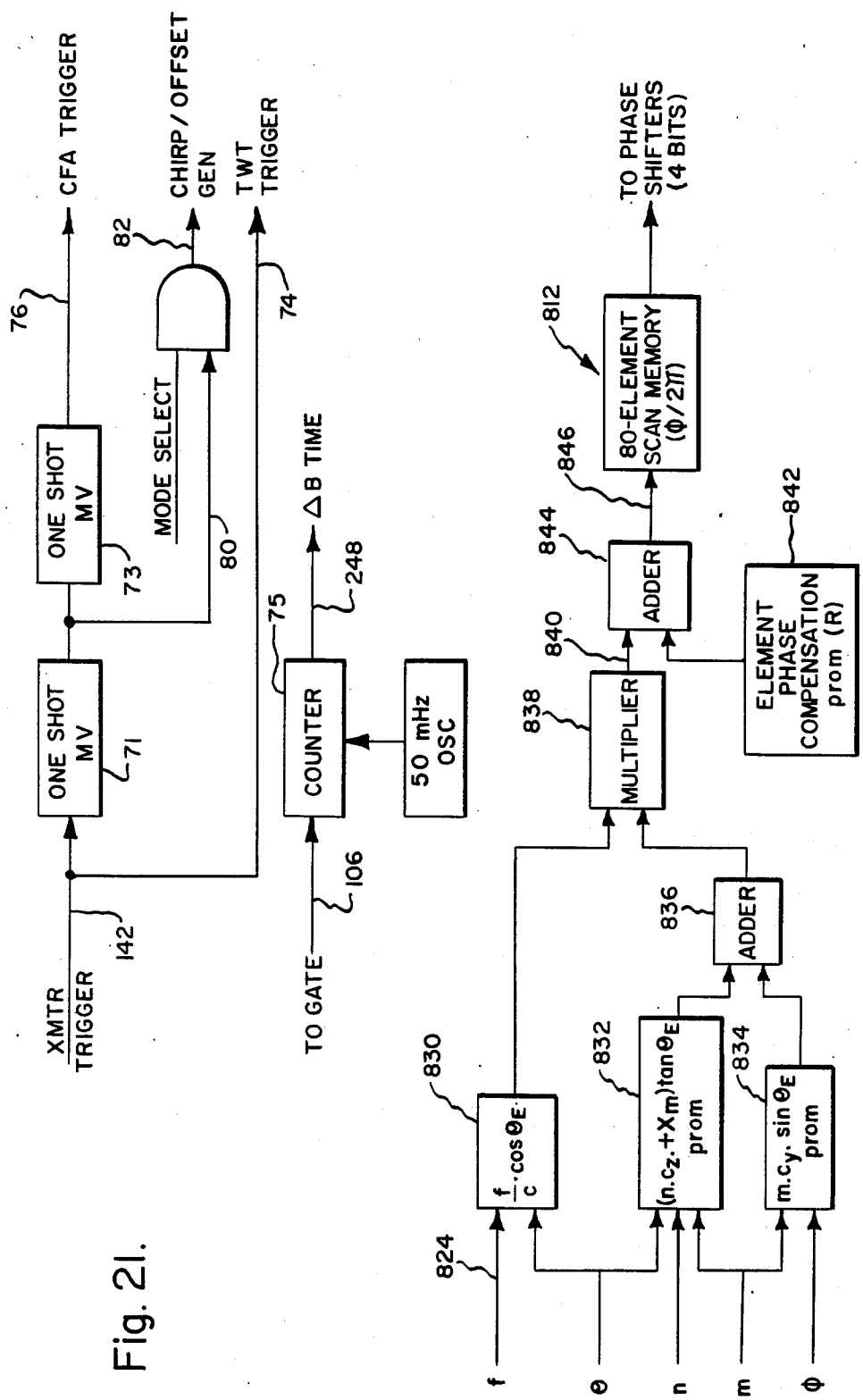

FREQUENCY AGILE RADAR SYSTEM

BACKGROUND OF THE INVENTION

The principles of an automatic landing system for aircraft disclosed in the Bossler et al U.S. Pat. No. 3,174,146 has been used as an aircraft carrier automatic landing system for some time. The system as used by the U.S. Navy was originally identified as AN/SPN 10, was later updated as AN/SPN 42, is currently in operation as AN/SPN-42A and is now undergoing further updating to be designated as AN/SPN-46. In all forms, however, the basic principles of the aforesaid patent have been used. Specifically, these systems have employed a radar/computer combination in conjunction with space-stabilized approach path for aircraft to determine vertical (altitude) and lateral (azimuth) position errors of an aircraft with respect to this approach path. Command signals are generated by the shipborne computer and are transmitted to the aircraft for automatic operation of its autopilot. Aircraft pitch command signal is generated having a term proportional to the vertical error, a term proportional to the derivative of the vertical error with respect to time, and a term proportional to the time integral of the vertical error. Similarly, aircraft roll command signals are generated having three terms, one proportional to the lateral error, one proportional to the time derivative of the lateral error, and one proportional to the time integral of the lateral error.

The constants of proportionality are varied in programmed fashion as a function of aircraft range and aircraft type as is explained in the aforesaid patent, the disclosure of which is incorporated herein by reference.

Although automatic landing systems of the above type have performed in highly successful fashion over many years of use by the U.S. Navy and others, a practical drawback exists because of the fact that the acquisition/tracking radar system used is of the "augmented" or "cooperative" type. By "augmented" or "cooperative" is meant that each aircraft is provided with some means which aids the radar system in identifying and tracking a known, fixed point on the aircraft. Such means may be, for example, a corner reflector or a beacon transponder. Corner reflectors are not believed to be desirable in view of the fact that, if permanently fixed, they present an excellent target for enemy radar devices. An alternative is to deploy them only during the landing operation. However, the orthogonality requirements for the faces of a corner reflector make the installation and deployment of a foldable corner reflector very difficult. Thus, transponders are currently employed on each aircraft. However, transponders are very complex pieces of equipment and experience has shown that at any given time it can be expected that upwards of 25% of a carrier's available aircraft will suffer transponder malfunction. This means, of course, that in inclement weather or in any condition where visual landing is not feasible or possible, only 75% of the carrier's aircraft may be launched, unless those aircraft having faulty transponders are to be sacrificed through retrieval failure. Although it is conceivable that circumstances could exist which would dictate such sacrifice, it must be considered, at best, as an extreme measure. In consequence of these facts, full strength naval strategy is still influenced by weather conditions and the presence of sufficient visibility to enable visual, pilot controlled landing aboard the carrier.

Naturally, it would be desirable to remove such a constraint and the invention disclosed herein enables same by eliminating any need for "augmentation" or "cooperation" as discussed above.

BRIEF SUMMARY OF THE INVENTION

This invention is specifically concerned with an improved form of automatic landing system for carrier based aircraft which is basically compatible with components of the AN/SPN-46, although it is in a broader sense concerned with an improved form of radar system suitable for that and other purposes.

Broadly speaking, this invention is concerned with an electronically steered phased array antenna radar system in which a space-stabilized volume is scanned by a symmetrical pencil beam which is steered in a number of increments such as to provide coarse granularity but sufficient to illuminate the entire cross section of the volume (e.g., raster type scan), with provision being made for periodically providing azimuth, elevation and range information with respect to a multiplicity of targets by scanning each such target at a small number of such incremental beam positions, such number being determined as an inverse function of target range. Preferably, between a predetermined near range and the acquisition window of the radar system, the small number of beam positions is four whereas within the near range region the small number of target illuminating beams is greater than four and is stepwise increased as range is decreased to assure overpainting the target both in elevation and in azimuth.

It is also preferable that the transition from far to near range is determined by target cross-section and 3dB beamwidth of the pencil beam, such that the transition occurs as the target cross section approaches but does not exceed the 3dB beamwidth.

Another broad aspect of this invention resides in the provision of pulse to pulse frequency diversity of the interrogating pencil beams at each of the beam positions whereby to reduce target noise (i.e., scintillation) and remove the necessity for a corner reflector or transponder at the target.

Preferably, the frequency diversity at far range is provided at discrete frequencies which stepwise cover a relatively large bandwidth whereas the frequency diversity at near range is provided by frequency "chirps" which cumulatively cover such bandwidth.

Preferably, the number of discrete frequencies at far range is thirty and the relatively large bandwidth is 300MHz whereas the number of frequency chirps at near range is six, each covering a band of 50MHz.

Another basic aspect of this invention concerns the use of coarse granularity with frequency diversity, as described above, in conjunction with amplitude averaging of the frequency-diverse echo signals returned during target scanning at the aforesaid beam positions which significantly reduces errors due to target scintillation and allows the radar computer to track the same point on the target from scan-to-scan, such point by virtue of the amplitude averaging being at or near the center of the aircraft radar cross section.

At far range where the target radar cross section is less than the area of an illuminating beam, the target is bracketed by four beam positions and is illuminated at many different frequencies at each of such beam positions. Based upon the aforesaid amplitude averaging, estimated angular position of the target is determined by the computer to a high degree of accuracy which, with range information added, may be resolved to rectangular coordinates (range, azimuth and elevation) to determine altitude error ($Y_E$) and lateral error ($X_E$) with respect to a predetermined landing path in accord with the principles set forth in the Bossler et al U.S. Pat. No. 3,174,146, the subject matter of which has been incorporated herein by reference. At near range where the target radar cross section is greater than the illuminating beam area, the target is "painted" in an enlarged raster scan with repetitive pulses of different frequencies. Based upon the amplitude analyses, a fixed point on the target is tracked by the computer to determine the aforesaid errors.

More specifically, scanning is by a symmetrical pencil beam with half-beamwidth separation between adjacent beam positions. The four beam positions which bracket or enclose the target at far range are sequentially illuminated many times by a sequence of discrete frequency pulses within a fixed frequency range. The frequency range and number of different frequencies at each beam position are chosen to minimize target scintillation to within the desired limits. Preferably, the frequency range is 300MHz at Kuband, e.g., from 15.4 to 15.7GHz, with illumination at thirty different frequencies covering the frequency range at each beam position. For near range scanning, each of the beam positions which cumulatively paint the target is illuminated by a sequence of "chirp" pulses, each of which covers a portion of the aforesaid frequency range. Preferably, each chirp signal is of 50MHz bandwidth and there are six successive chirp illuminating signals at each beam position.

The landing system accommodates a plurality, preferably up to six, of aircraft and the computer portion of the system controls the scanning in accord with the above for each of the aircraft in question The antenna is preferably an electronically steerable, planar phased array with identical illumination taper in both the E and H planes to provide a pencil beam of 1° beamwidth.

Preferably, long range scanning is effected by connecting the antenna to a long range transmitter adapted to cover the requisite increments of the 300MHz frequency band. The transmitter is triggered at a PRF of 12kHz to provide 100 nanosecond pulses, allowing about 83 microseconds between pulses to accommodate a pulse round trip travel time equivalent to somewhat greater than six nautical miles. When the target is within about one-half nautical mile range, the antenna is switched to the short range transmitter which provides the requisite chirp illumination pulses.

The search scanning mode at long range is effected by a raster scan covering a space stabilized acquisition "window" and the system is capable of simultaneously accommodating a plurality of aircraft. Within the search mode, as controlled by computer, are the far and near range target scanning modes for targets already acquired. As noted, the far range target scanning mode involves bracketing the target within four of the beam positions with a plurality (preferably thirty) of different frequencies within a predetermined band being transmitted at each of the four beam positions, whereas the near range target scanning mode involves painting the target with successive chirp illuminations to cover the frequency band at as many of the beam positions as are necessary to wholly encompass or "paint" the target.

Thus, it will be appreciated that whereas the far range scanning mode is of fixed format, for the near target scan mode it will be necessary to periodically increase the number of beam positions required for painting as the aircraft range decreases, i.e., to "balloon" or "swell" the raster coverage.

As noted earlier, the system disclosed herein is particularly directed to the problem of landing aircraft on a carrier at sea under conditions in which pilot-controlled landing of aircraft would not be possible. Since the carrier is subjected to wave motion, whereas the volume of space being monitored must be stabilized, the antenna must be capable of scanning a much larger volume than is actually used to cover the space-stabilized acquisition "window". Principally, pitch, roll and yaw motions of the carrier most significantly affect the system at far range whereas at close range heave is also a significant factor. Because the height of the acquisition "window" which is located about six nautical miles from the carrier need not be very large because of the ability of the aircraft to fly at accurate height, the stabilized "window" need not subtend an angle in elevation more than about two degrees. However, since the pilot may err in azimuth to a much greater degree, e.g., in the order of ±10°, the acquisition window is chosen to subtend an angle in azimuth of about twenty five degrees. Thus, because the raster scan is at half beamwidth points and since the beamwidth is chosen as 1° there is a total of $50 \times 4 = 200$ beam positions which define the space-stabilized acquisition "window". However, in order to cover the "window" despite ship's own motion, the antenna is chosen to be capable of scanning a volume subtending ±30° in azimuth and ±10° in elevation, e.g., a total of 4800 potential beam positions.

Taking into consideration the approach velocity which can be expected, the target scan time must be chosen short enough to "freeze" the aircraft and thereby avoid intolerable track error. For the system disclosed, this target scan time is chosen to be ten millisecond (10ms). Since for ranges, from about one half nautical mile to the "window", the target scan is effected at four beam positions and at thirty different frequencies at each beam position, the radar transmitter is thus required to be triggered at a PRF of $4 \times 30/0.01 = 12$kHz. At the transition to close range, which is chosen as that range (approximately one-half nautical mile) where the four beam positions for far range target scanning are no longer adequate to assure complete target "painting", the target scan "swells" under control by the computer to encompass a greater number of beam positions. For the disclosed system, the transition is characterized by a $3 \times 2$ raster, that is, three beam positions in azimuth and two beam positions in elevation. Since the target scan time remains the same while the number of pulses at each beam position is reduced to six chirps, the transmitter PRF at transition is decreased to $3 \times 2 \times 6/0.01 = 3.6$kHz. However, the transmitter PRF must be increased every time the raster size is increased in order to assure that the scan time remains constant. The maximum value of transmitter PRF occurs at the "command freeze" range, chosen as about two hundred feet from touchdown. At "command freeze", the target aircraft is on the desired landing path and all autopilot commands are "frozen" until touchdown at which time all commands including power command are terminated. Since for aircraft types for which the disclosed invention is concerned will be "painted" by a raster scan of $24 \times 12$ beam positions at "command freeze", the maximum transmitter PRF will be 24×12×6/0.01=172.8kHz.

It will also be appreciated beam pointing electronics will require various pulse repetition frequencies. For search scan and long range target scan, this PRF will be 12kHz/30=400Hz, taking into consideration that each beam position is illuminated at the thirty different frequencies before moving to the next beam position. At the aforesaid transition to close range tracking, the beam position PRF will be 3.6kHz/6=600Hz and will be increased for each raster "swelling" to a maximum of 28.8kHz at "command freeze".

The system disclosed is also chosen to provide long range target scan at a rate of 5Hz for two most distant targets and at a rate of 10Hz for three closer distant targets, and to provide close range target scan of that aircraft next-to land at a rate of 20Hz.

Circular polarization is used in this invention in order to permit the acquisition capability of the radar system to extend to about four nautical miles in heavy rainfall (e.g., 20mm per hour).

BRIEF DESCRIPTION OF THE DRAWING FIGURES

FIG. 19 is a block diagram of a portion of the beam steering electronics;

FIG. 20 is a diagram of the element phase processors; and

FIG. 21 is a diagram of an embodiment of the control module 78 of FIG. 3.

Figure 1:
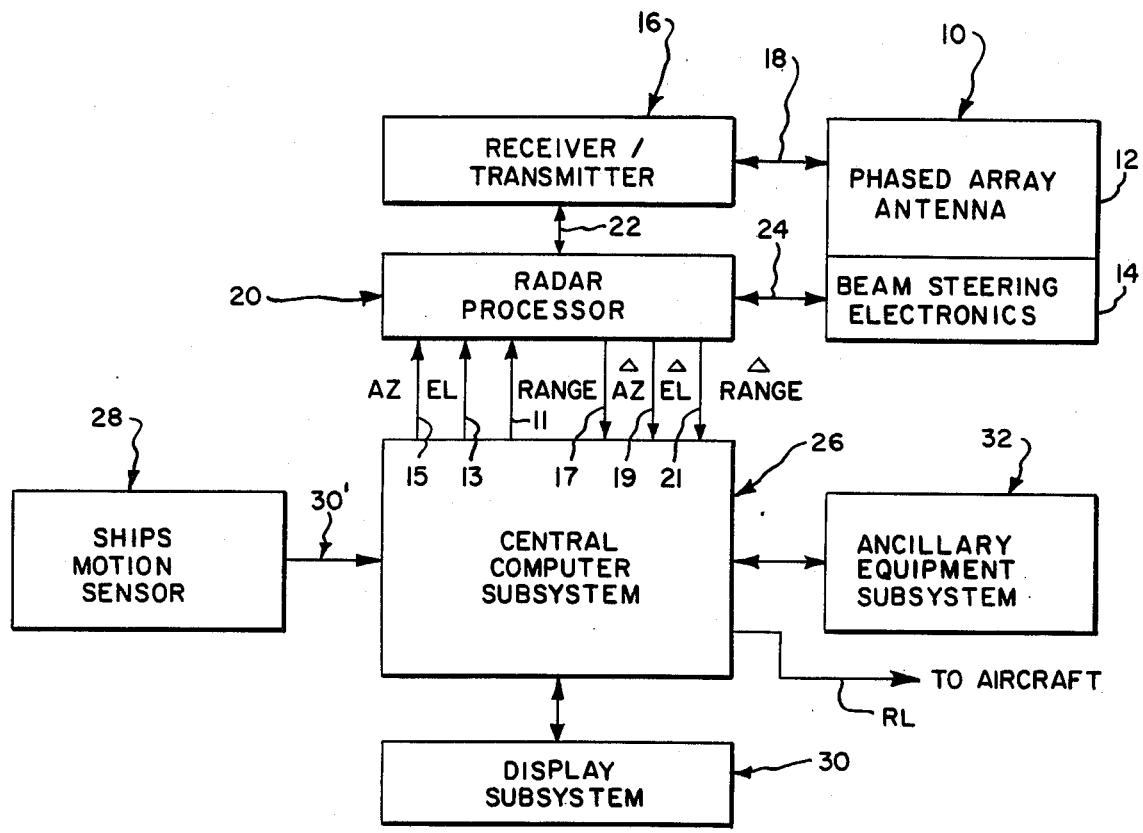
FIG. 1 is a block diagram of a preferred embodiment of the invention.

With reference to FIG. 1, a simplified block diagram of the aircraft carrier landing system according to the present invention is shown therein. As illustrated, the system includes the electronically steered phased array antenna system indicated generally by the reference character 10 which includes the phased array antenna 12 and the beam steering electronics 14 therefor. The radar receiver/transmitter is indicated generally by the reference character 16 and is connected to the phased array antenna by means of the two way street 18 as shown. The receiver/transmitter is controlled by the radar processor 20 over the two way street 22 and the processor also controls the beam steering electronics over the two-way street 24. The central computer subsystem 26 provides azimuth, elevation and range data to the radar processor 20 and receives azimuth, elevation and range error data therefrom. The system includes the ship motion sensor system 28 which provides an input at 30 to the central computer subsystem., and to complete the system, the central computer subsystem is connected to the display subsystem 30 and the ancillary equipment subsystem 32.

It will be understood that the data from the central computer subsystem 26 at the lines 11, 13 and 15 represents the polar coordinates of the expected target position due to the pitch and roll commands relayed to the aircraft. Thus, the "range" is slant range whereas the azimuth angle and the elevation angle may respectively be given conventional notation. The data returned by the radar processor 20 at the lines 17, 19 and 21 are representative of deviations between the expected polar coordinate data and that actually measured by the radar system. Thus, the data on the lines 17, 19 and 21 are update data fed to the central computer subsystem upon which new estimated data at the lines 11, 13 and 15 are based.

Figure 2A:
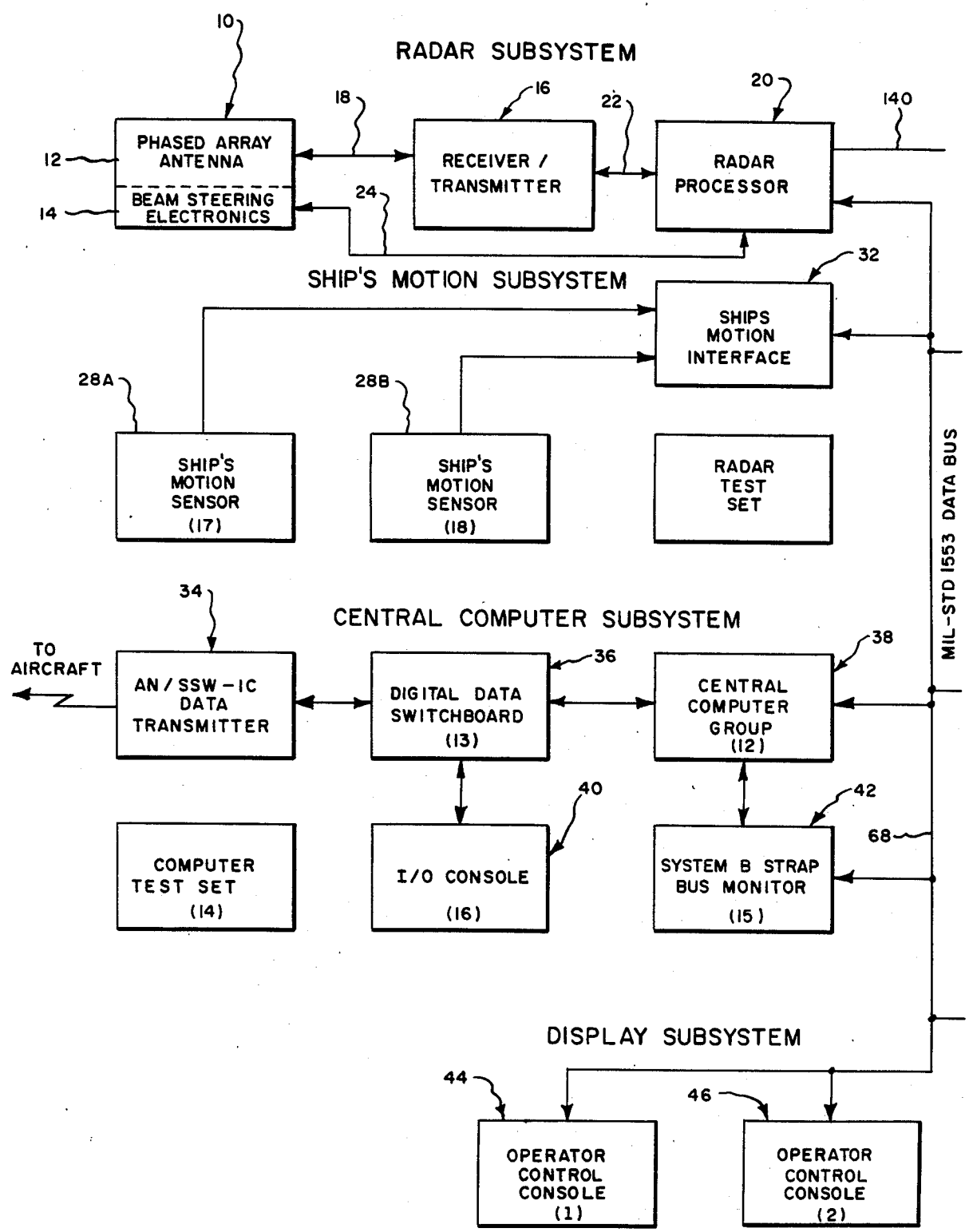
FIGS. 2A and 2B are an expanded block diagram of the preferred embodiment.
Figure 2B:
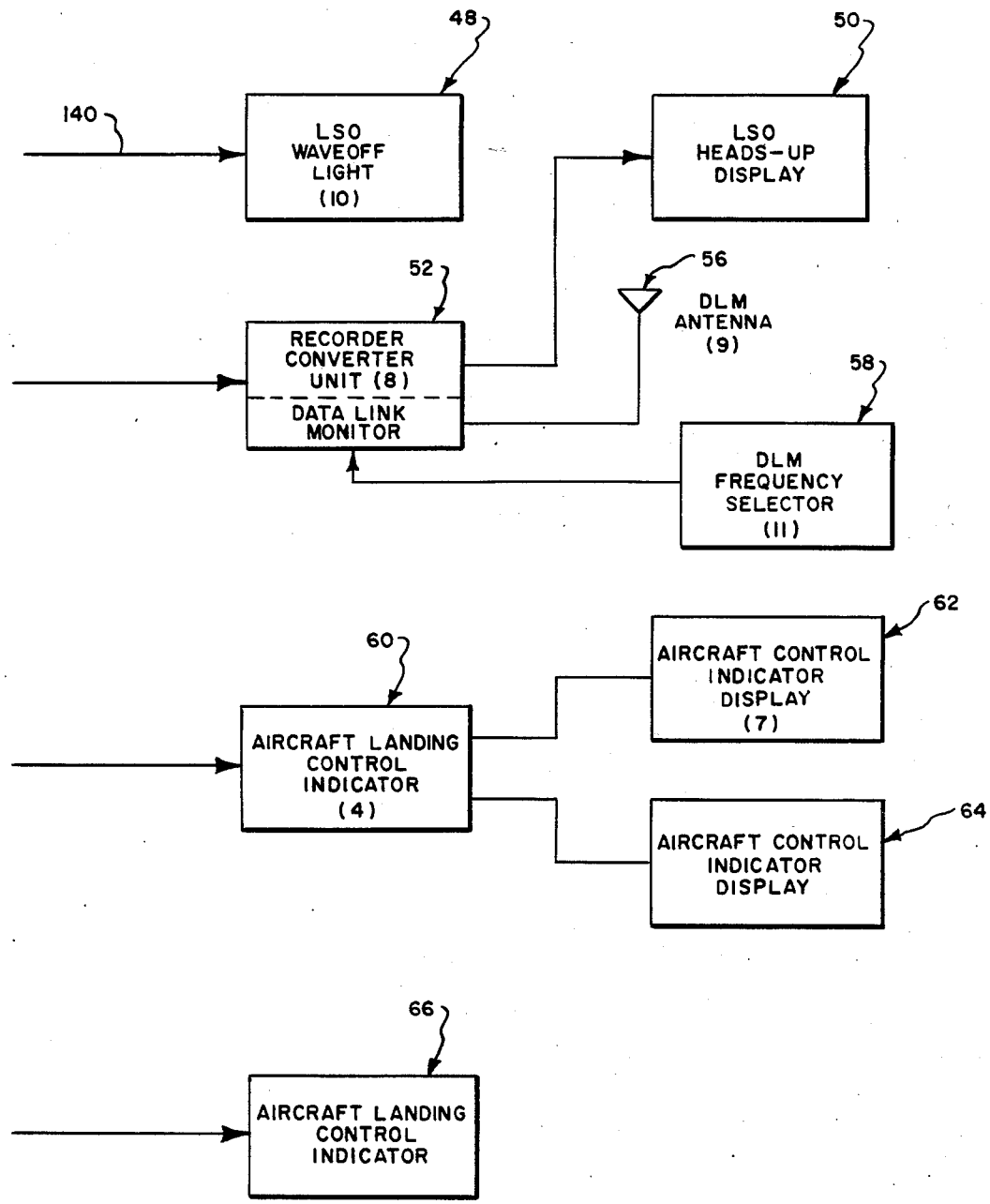

A more detailed block diagram of the system shown in FIG. 1 is illustrated in FIGS. 2A and 2B. The radar subsystem as illustrated in these Figures includes the phased array antenna assembly 10, the receiver/transmitter 16 and the radar processor 20. The ship's motion subsystem includes the two ship's motion sensors 28A and 28B which are connected to a ship's motion interface 32. The central computer subsystem includes the data transmitter 34 connected to the digital data switchboard 36 which is in turn connected to the central computer group 38. The switchboard 36 is connected to the input/output console 40 and a system bootstrap bus monitor indicated generally by the reference character 42 is connected to the central computer group.

The display subsystem includes the two operator control consoles 44 and 46 whereas the ancillary equipment subsystem includes the landing signal officer (LSO) wavelight 48, the LSO heads-up display 50, the recorder converter unit 52 which includes the data link monitor section 54, the data link monitor antenna 56, the data link monitor frequency selecting generator 58, aircraft control indicator 60, the aircraft control indicator display 62 and the second air craft control indicator display 64, the aircraft landing control indicator 66 which completes the ancillary equipment subsystem. To complete the description of this portion of the system, it is to be noted that the military standard 1553 data bus 68 is employed to interconnect the various subsystems, substantially as is shown. In FIG. 2A and 2B, a number of the blocks shown are identified with numerals in brackets and these numerals are unit numbers of the AN/SPN-46 system. Thus, the blocks 28A, 28B, 36, 38, 40, 42, 44, 46, 48, 52, 54, 56, 58, 60, 62, 64 and 66 are standard units of the AS/SPN 46. The blocks 10, 16, and 20 are components which are peculiarly related to the present system. The remaining blocks 32, 34 and 50 which bear no bracketed unit number should also be mentioned. The interface block 32 is shown separately although its identical function is performed in the AN/SPN 46 by the radar computer unit thereof. However, in the present system, the radar processor has been modified such that the interface 32 is constructed as a separate entity.

The block 34 bears no bracketed unit number because, as is the case also for the display 50, it is a unit provided on the aircraft carrier and to which the various landing systems, including the AN/SPN-46 and the present system provide input. It should be noted also that the two sensor blocks 28A and 28B are identical, that is redundant, units. Although the original AN/SPN-10 system used only pitch, roll and yaw motions as ship motion inputs, later systems have extended these inputs to the full six degrees of freedom exhibited by the carrier. Thus, each unit 28A and 28B provides, in addition to the three angular outputs of pitch, roll and yaw, the motions along these axes as well, i.e., fore and aft motion or "jerk" signals, vertical motion or "heave" signals and lateral motion or "slip" signals. These do not fundamentally alter the functioning of the system and merely provide for more accurate determination of the deviations of an aircraft from the desired path to which it is commanded. At this point it may be well to mention that although former systems have employed a common path for all incoming aircraft (i.e., a 3° glideslope centered in the acquisition window) the present invention contemplates, as well, the use of a separate glideslope for each aircraft as determined by its penetration point of the acquisition window.

It should be noted at this point that the radar processor 20 is not wholly new inasmuch as it includes the computer AN/AYK-14 previously used. In addition however, timing, amplitude measuring, range measuring and storage functions are performed by the processor 20 outboard of the radar computer as will be apparent hereinafter.

Figure 3:
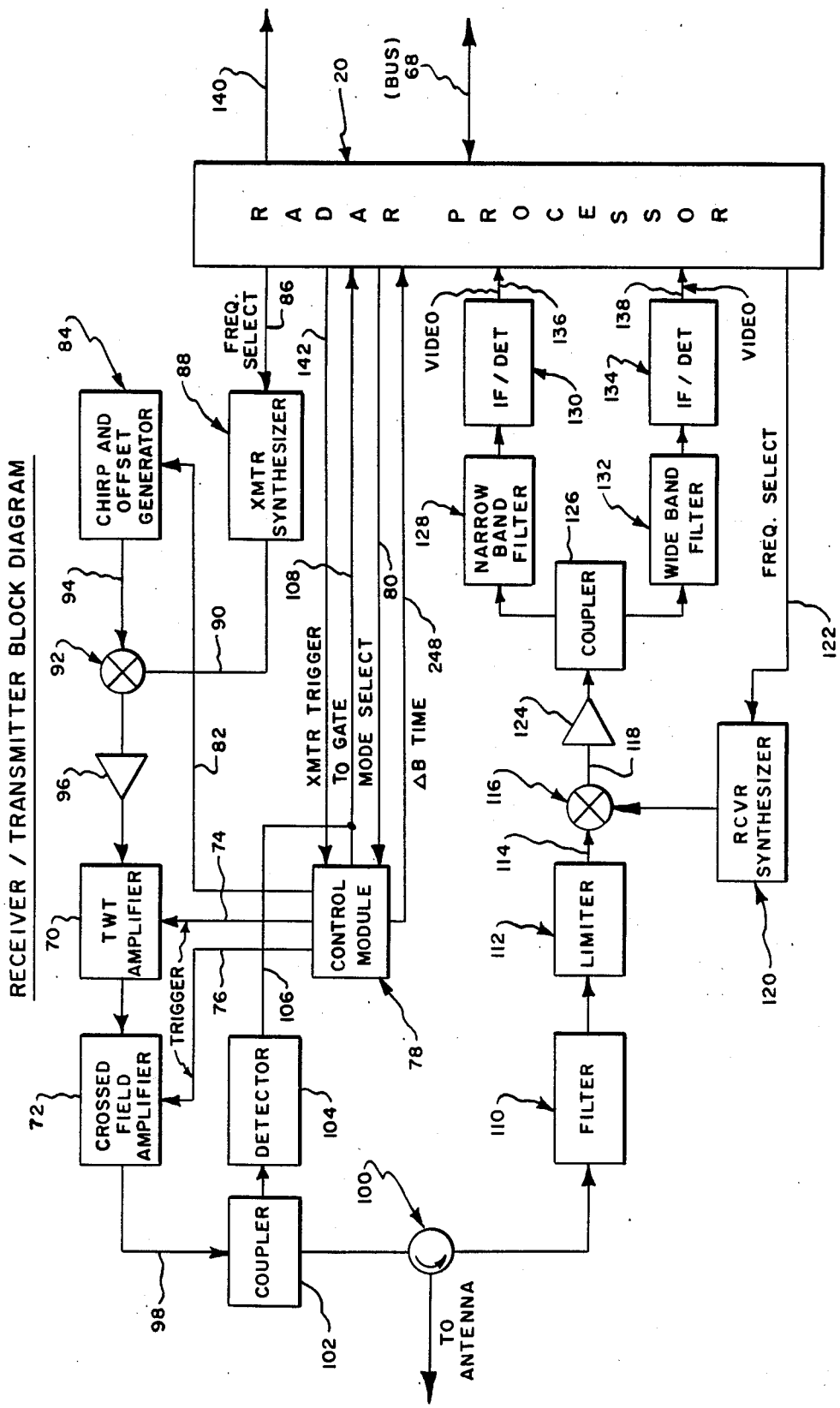
FIG. 3 is a block diagram of a portion of the system showing details of the receiver transmitter.

The receiver/transmitter portion 16 is illustrated more particularly in FIG. 3 of the drawing. The transmitter consists of a series arrangement of a traveling wave tube amplifier 70 and a crossed field amplifier 72 which are respectively triggered by means of the conductors 74 and 76 under control of the symbolized control module indicated generally by the reference character 78. As will be apparent hereinafter, the functions of this module are performed by circuits included within the radar processor but the block 78 has been shown outside it in this Figure for the sake of clarity. As will be presently apparent, the transmitter system operates in a plurality of modes, namely, a single far range scanning mode and a plurality of near range scanning modes. The particular mode required is selected by the radar computer portion of the radar processor 20 as indicated by the connection 80 to the control module 78 so that a corresponding mode selection signal is output over the line 82 to the chirp and offset generator indicated generally by the reference character 84. Correspondingly, a frequency select signal is output by the radar processor 20 over the line 86 to the transmitter synthesizer 88 whose selected frequency output at the line 90 is summed, at 92, with the output signal at 94 either of the chirp signal or the offset signal generated by the generator 84. The output of the summer 92 is applied to the buffer amplifier 96 and then to the TWT amplifier 70, as shown. The transmitted signal travels over the line 98 and through the duplexer 100 to the antenna. Part of the energy is coupled out by the coupler 102 which, after detection at 104, is provided as an input at 106 to the control module 78 and to provide the $T_o$ gate signal at 108 which is input to the radar processor 20.

The receiver portion of the system includes the bandpass filter 110 followed by the receiver protection limiter 112 whose output at 114 is connected to the summing circuit 116 to provide the IF output at 118. The summer 116 receives the output of the receiver synthesizer circuit 120 which receives its frequency select signal at 122 from the radar processor 20. After buffering at 124, the IF signal is coupled at 126 to the far range channel which includes the narrow band filter 128 followed by an IF detector 130 and the near range channel which includes the wide band filter 132 followed by the IF detector 134. These two channels provide the video output signals at 136 and 138 which are applied to the radar processor as shown. In addition to the connection to the data bus 68, the radar processor is shown having the output at 140 to the LSO waveoff light 48 shown in FIG. 2B.

The control module, circuit 78 in FIG. 3, is simply a timing and delay circuit which is triggered by the transmit trigger from the radar processor. One simple implementation is shown in FIG. 21.

The two one shot multivibrators 71 and 73 simply provide a controlled delay. In this manner the TWT can be initiated prior to the start of the chirp signal if the short range mode is required. Similarly, the TWT is initiated prior to triggering of the CFA for the long range mode of operation. The remaining portion of the control module is a timing counter 75 triggered by the transmitter output and timing out the received echo interval. The $\Delta B$ time output is then a control signal bracketing all possible returns or about 83 microseconds.

The transmitter trigger signal at 142 is under control of the radar processor 20 and dependent upon which of the modes is selected at 80, the control module 78 provides the trigger at either of the lines 74 or 76. As noted earlier, there are two fundamental modes, the near range and the far range. The near range transmitter is the traveling wave tube amplifier 70 whereas the far range transmission is effected by the crossed field amplifier 72. At far range, the acquisition scan is of the raster type and is such as to cover a space stabilized acquisition window defined by four beam positions in elevation and fifty beam positions in azimuth, i.e., four rows and fifty columns. When a target is detected, no attempt to center the antenna thereon for tracking is made. Rather, interlaced within the scanning are four beam positions selected to enclose the target position and interrogation at each of these four beam positions is made. At each of the beam positions of the raster, the TWT amplifier 70 and CFA 72 transmits a succession of thirty pulses, each of a different frequency at each beam position. Thus, the generator 84 is operating in the offset mode so that the thirty successive frequencies from the synthesizer 88 as controlled by the signal 86, when summed at 92 are at the proper frequencies for transmission. Specifically, the radar of the present system operates at $K_u$ band from 15.4 to 15.7GHz, the thirty frequencies covering the band (i.e., 300MHz) in 10MHz steps, starting at 15.41GHz.

The specification for the far range transmitter/receiver are as follows:
Center frequency—15.55GHz
Frequency diversity—300MHz
Spacing between frequencies—10MHz Transmitted power—70KW
Antenna Gain—37dB
Receiver Noise—8dB
Antenna beamwidth—1 degree
Target cross section ($\sigma$)—2.5 square meters
Polarization—Circular
Pulse Width—0.1 microsecond
Receiver bandwidth—10 MHz For the near range, the frequency diversity is achieved over the 300 MHz range by a succession of six 50 MHz chirp pulses, each of 0.1 microsecond duration and the receiver bandwidth during this mode is 50 MHz. Transmitter power during near range transmission is 20 KW.

The far range scanning is carried out at a fixed rate whether it be for acquisition or for target scanning. This fixed rate is limited by the maximum position at which detection of an aircraft within the acquisition window is desired, i.e., adequate round trip travel time is the limiting factor. It is preferred herein that the window be at about six nautical miles from the aircraft carrier and, using a pulse width of 100 nanoseconds, a PRF of 12 KHz is employed. Since there are thirty frequencies transmitted at each beam position, the beam steering PRF at far range scanning is 400 Hz. The near range scanning modes differ from the far range mode and from each other by the number of beam positions employed. Also, the near range modes differ from the far range mode in that six chirp pulses per beam position are employed. Thus, the beam steering PRF at any near range scan mode is one-sixth that of the corresponding transmission PRF. The transmission PRF at any near range scan is dictated by the fixed transmission time employed for the system. This fixed time is 10 milliseconds, chosen to assure that the aircraft is "frozen" during scan. The transmission PRF is thus the resultant of the number of beam positions required for the scan multiplied by the six pulses divided by 10 milliseconds.

As noted earlier, the far range scanning of a target takes place at four selected beam positions. At about ½ nautical mile, the target is too large to be wholly "painted" by the four-position raster scan. At this range, the scan raster is ballooned to 3×2, i.e., three beam positions in azimuth and two in elevation. Although not essential for successful operation, the rule used herein for raster swelling is that the azimuth scan is increased stepwise until it is twice that of the elevation scan, at which time the next ballooning involves increasing the elevation scan one beam position, e.g., the sequence 3×2, 4×2, 4×3, 5×3, 6×3, 6×4 etc., is used. At each "ballooning", the transmission PRF must be increased, with a corresponding increase in the beam steering PRF.

Figure 4:
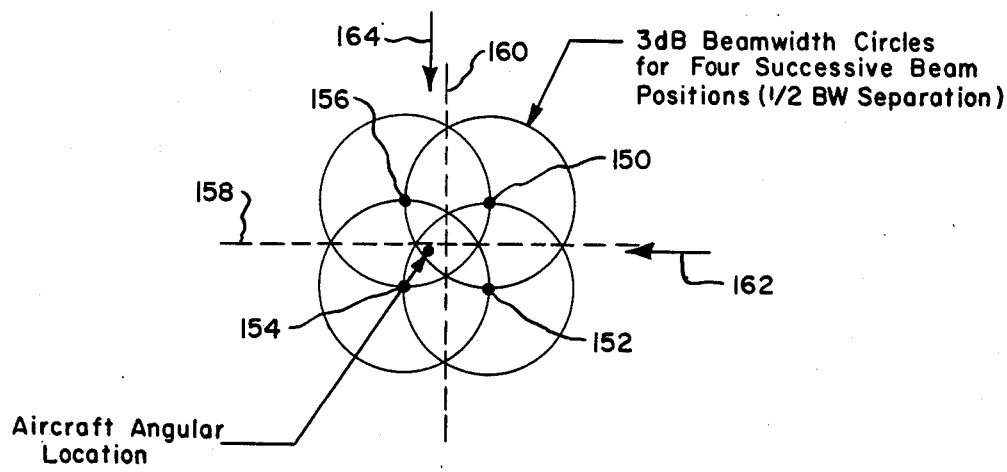
FIG. 4 is a diagrammatic illustration of far range target scanning.

FIG. 4 illustrates certain principles of the far range target scanning. As shown, the target is bracketed by the four beam positions 150, 152, 154 and 156. For the purpose of angular location of the target within the bracketed area, an elevation zero reference line 158 and an azimuth zero reference line 160 are shown. The intersection of these lines is the current estimate of the target's center and is at the geometric center of the square defined by the four beam positions. Equal angular locations of the beams are disposed on the right and on the left of the azimuth zero centerline 160 and equal elevational angle increments of the beams are disposed above and below the elevation zero line 158. However, for azimuth the beam positions 150 and 152 which are to the left of the line 160 are considered positive whereas those to the right, 154 and 156, are considered negative. Similarly, the two beam positions 150 and 156 above the elevation zero line 158 are considered positive whereas those two below 152 and 154 are considered negative. Each beam position is interrogated a total of thirty times (once at each of the thirty different frequencies as described above) and the sum of the echo amplitudes at all of these frequencies at each of the beam positions is determined. Then, by an amplitude processing technique effected within the radar processor computer, the measured angular positions indicated by the arrows 162 and 164 are computed with respect to the reference lines 158 and 160. These two values (measured elevation and measured azimuth respectively) are suitably factored with the known angles of lines 158 and 160. These two actual angles are used together with the new value of computed range to update the aircraft position which determines the choice of the four beam positions which will be used on the next scan of this particular target.

Figure 5:
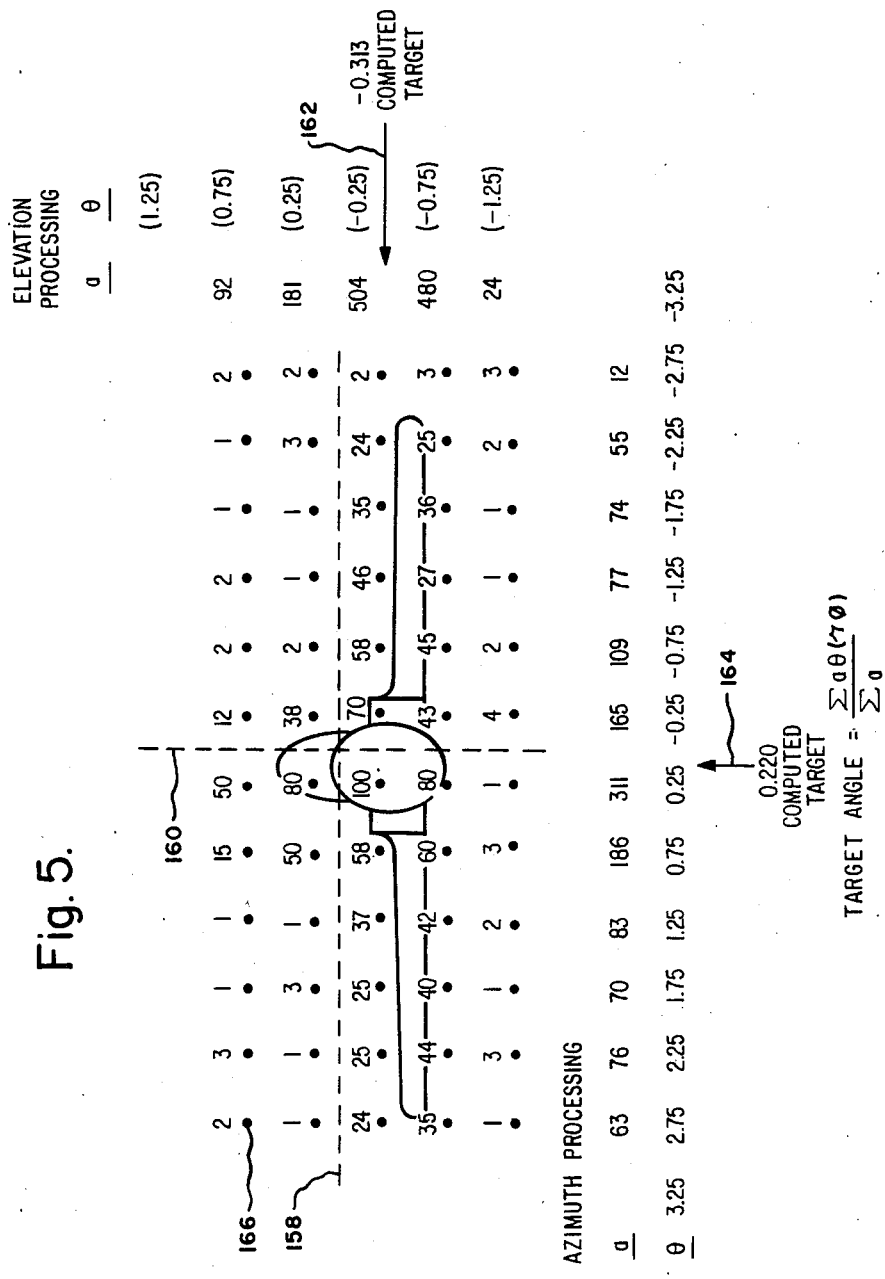
FIG. 5 is a diagrammatic illustration of near range target scanning.

FIG. 5 illustrates the target scanning technique at near or close range. The aircraft is shown as it would appear at a very close range where five elevation rows, each containing twelve azimuth columns, are required to "paint" the target, each beam position being indicated as a dot as indicated by the reference character 166 at the upper left corner of the Figure. The 12×5 raster shown has been chosen to illustrate that the previously noted "ballooning" rule is not essential for successful operation but may, to the contrary, be chosen in any fashion so long as the target is fully "painted" at each scan. The numerals above each of the beam positions indicate the amplitude sums in response to the six chirp pulse interrogation signals at each beam position. Since the type of target scan illustrated in FIG. 5 will occur only at near range, where the target would not be wholly encompassed by the four beam positions shown in FIG. 4, the raster size has been increased by the radar processor based upon estimated range and the type of aircraft involved, to "paint" the target completely. During this near range scanning, the transmitter of FIG. 3 is operated in the chirp mode, i.e., the illumination is generated by the TWT amplifier 70, with the 300 MHz. It will be seen from the example shown in FIG. 5 that the two zero reference lines 158 and 160 are normally normally near the expected tracking center of the target. The column and row computations which determine the computed target angular positions 162 and 164 will weight the amplitude sums for each beam position as a function of the distance from the intersection of the two lines 158 and 160. It has been found that this technique gives good accuracy in the presence of noise. Other and different forms of locating a tracking center from the distribution of amplitude response sums at the various beam positions could be used.

For example, an equal area distribution both in elevation and in azimuth can be used rather than the "centroid" type of tracking illustrated in FIG. 4. That is, with respect to the area under a plot of azimuth angle versus the column sums of the amplitudes, the azimuth angle corresponding to that which represents the angle at which equal areas lie to either side of it is used as the computed azimuth angle of the target. Similarly, the elevation angle is determined using the row sums of the amplitudes.

In fact, a number of techniques can be employed for processing the measured target data. Certain of these are summarized below:

A. Artificial Intelligence. This technique depends upon the fact that the target is a known aircraft type. A complete three dimensional model of this aircraft type is stored in a processor and this model is manipulated or maneuvered (e.g., as to aspect angle) to render a best fit with the measured data. The orientation of the model is then read and assumed to be the real data.

B. Contrast Enhancement. In this technique, the amplitude of each return at one frequency or the summation at a beam position of the raster scan is raised to some power (e.g., squared, etc.). The equal area or centroid method is then applied to the result. A limiting case of this technique where only the largest amplitude return of the thirty frequencies at each beam position is stored has been used in a simulation, with the result that performance was improved in the plane of asymmetry of the target (i.e., improves elevation performance) but was degraded in the symmetrical plane (e.g., degrades azimuth performance).

C. Weighting. In this technique, the sum of the amplitude values of the thirty frequencies at each beam position is scaled non-linearly as a function of the beam position from the center of scan (note that the centroid technique essentially does this in a linear fashion). For example, the scaling may be done exponentially so as to weigh beam positions more heavily the nearer they are to the center of scan.

D. Error Filtering/Processing. In this technique, an error calculation is performed by some previous method and further processing of the result is effected. For example, the previous measurement may be compared with the current measurement and the difference noted. This difference (error) is compared with what the target physically could have done and the error weighed appropriately. This technique may be made adaptive by considering more of the past history than merely the previous measurement.

Non-linear error processing can be implemented in many ways. For example, the measured error to an angle may be considered and final error determined as the sine of the error. For small angles, the sine is approximately the angle and weighting is small. However, as the measured error becomes greater, the sine function reduces the error. A scaling and a square root accomplish a similar function.

E. Iterative Processing. In this technique, a first pass is made on the data with one of the above techniques. Based on this result, only a small portion of the data located near the predicted value is processed, possibly by a separate or different technique to refine the estimate. This could be thought of as a special case of the weighting argument.

It should be noted that different processing schemes can be employed in the azimuth and elevation channels. For example, a straight equal area technique may be used in azimuth and the largest amplitude technique in elevation. At present, the criteria for selection is lowest scintillation noise with sufficient gain to maintain aircraft control.

Figure 6:
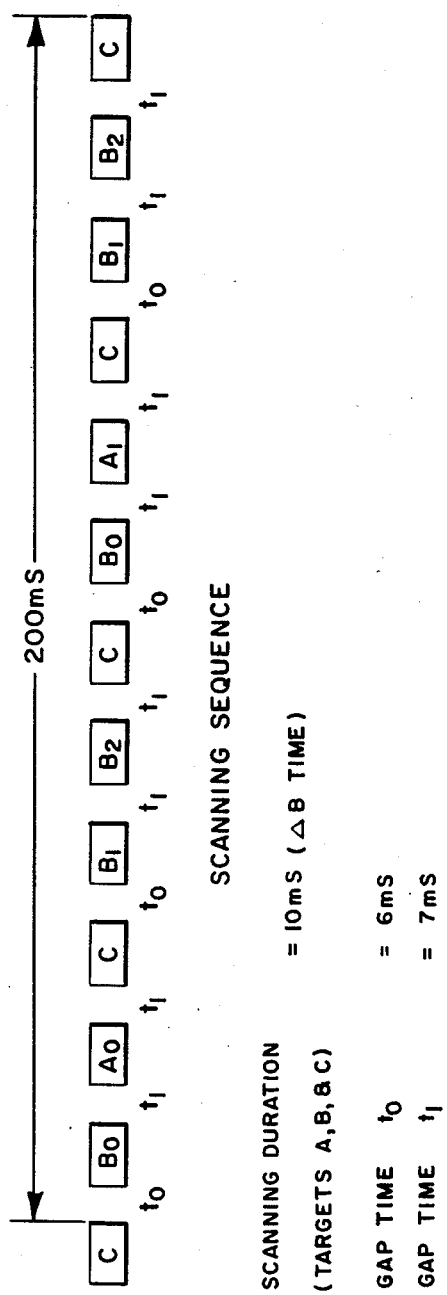
FIG. 6 is an illustration of the principles of scanning sequence and timing.

As has been mentioned previously, the system according to the present invention is capable of providing updates on six different target aircraft and the timing thereof is illustrated in FIG. 6. As noted therein, the "A" targets are the most distant and they are updated at a rate of 5 Hz the two most distant aircraft being of this type. Next the three targets which are still distant but closer than the most distant targets are target types B and the data is updated at a rate of 10 Hz. Lastly, the near or close target "C" is updated at a rate of 20 Hz. The target scanning duration in each instance is 10 milliseconds, requiring to a PRF of 12 kHz for the distant or far scanning and being variable for the close or near range scanning as will be set forth more particularly hereinafter. It will be appreciated that when there are fewer than six aircraft being scanned, the corresponding scanning times will be filled with acquisition window scanning. However, it should be noted that a total of ½ second scanning time is required to scan the entire 4×50 acquisition window.

Figure 7:
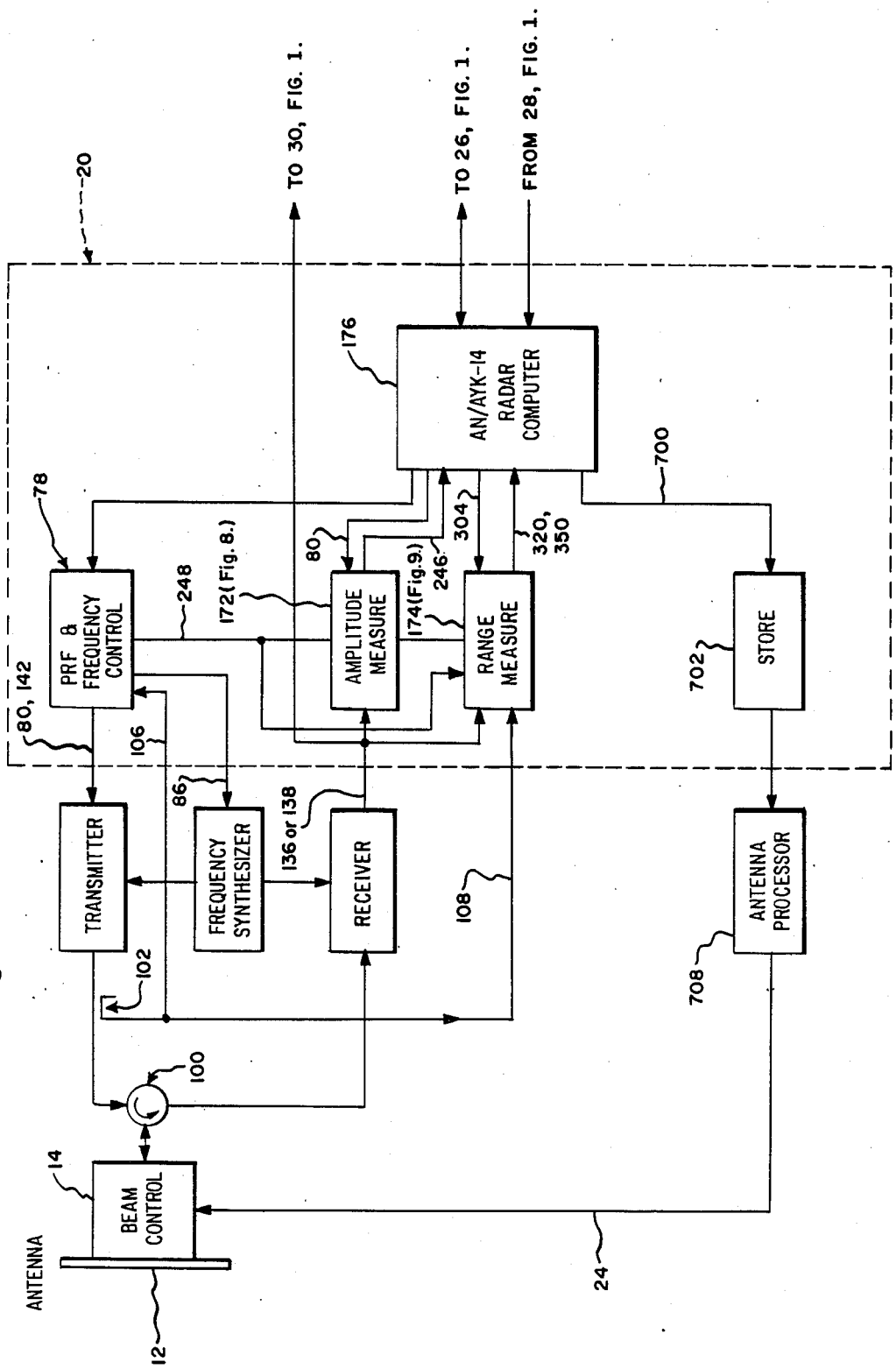
FIG. 7 is a partial block diagram showing details of radar processor.

Reference is now made to FIG. 7 which shows the transmitter/receiver in somewhat simplified form but showing important functional blocks within the radar processor 20. As illustrated, the control circuit 78 is included in the radar processor 20. Also, an amplitude measuring circuit 172, a range measuring circuit 174 and a radar computer 176 are also included.

Figure 8:
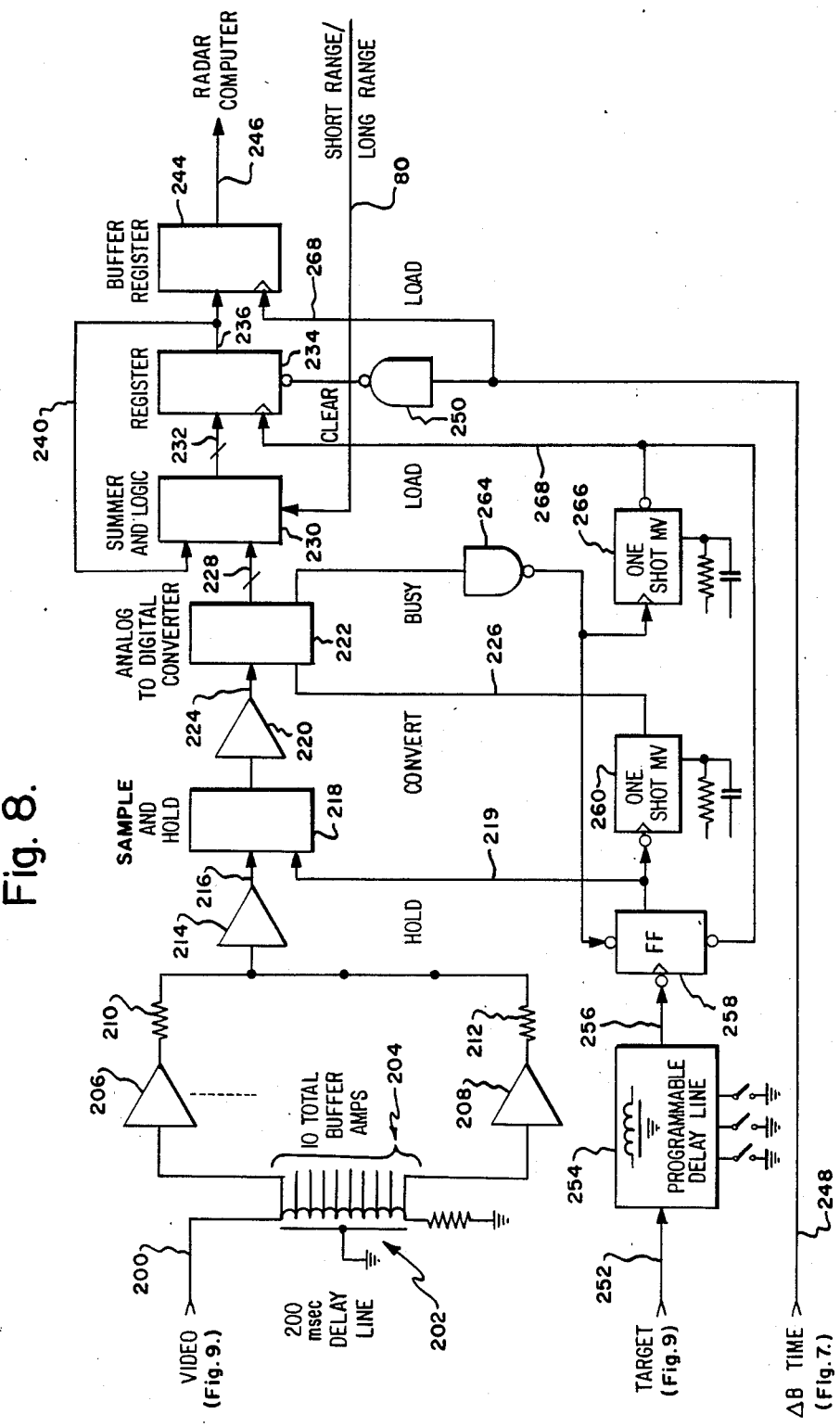
FIG. 8 is a diagram of the amplitude measuring position of the radar processor.

The target return amplitude detection circuit is shown in FIG. 8. The video signal is input at 200 to the 200 nanosecond delay line 202 which is provided with the ten equally spaced taps 204 as shown. Each tap is connected with a buffer amplifier although for clarity only two such amplifiers 206 and 208 are shown in FIG. 8. The outputs of all these amplifiers are summed by resistors such as those indicated at 210 and 212 to provide an input to the common amplifier fier 214 whose output at 216 is applied to the sample and hold circuit 218. The "hold" signal at 219 is generated as described hereinafter to time this operation to occur when the video pulse is substantially centered in the delay line 202. In this way, the output of the circuit 218 through the buffer 220 to the A/D converter 222, at 224, is the sum of the amplitude returns at the ten taps of the delay line 202. The "convert" signal at 226, timed as hereinafter described, provides the digital representation of each such sum at the output 228 which is applied to the summing circuit 230. The output of the circuit 230, at 232, is applied to the register 234 which provides an output at 236 which is input to the buffer register 244 and is also recirculated back to the circuit 230 as indicated at 240. The logic of the circuit 230 is controlled by the mode select signal at 80 from the radar computer, the circuit 230 functioning to accept the recirculated sums at the line 240 thirty times during long range target scanning and six times during short range target scanning. Thus, the sum of all the thirty amplitude returns at long range scan or the sum of all six amplitude returns at short range scan ultimately is available at the buffer register 244. At the completion of each target scan, the buffer register 244 is loaded and its contents are output at 246 to the radar computer as the amplitude data for the corresponding beam position for that scan. At the same time, the register 234 is cleared. The "load" timing of the buffer 244 is controlled by the target scan time signal at 248 which is input from the radar processor timing circuit 78 hereinafter described and which is of a duration equal to each target scan time. The inverter 250 provides a slight delay to clear the register 234 just after each target scan.

The purpose of the circuitry shown in FIG. 8 is to sum all thirty returns at the long range or six returns at short range. This summed output is present in register 234 at the completion of a beam position. Register 244 is a buffer which is used to hold the results of a beam position prior to transfer to the radar computer. In this manner register 234 can be cleared immediately and a new beam position started prior to the radar computer taking the resulting data. The inverter 250 is required to ensure that register 244 is loaded prior to register 234 being cleared.

It should be recognized that this circuitry could also be implemented by simply providing the output of the analog to digital converter 222, line 228 to the radar computer for summing. This requires the computer to accept data at a high 12 KHz data rate. The summer 230 and register 234 reduce this data transfer rate by a factor of 30 at long range and a factor of 6 at short range.

The "target pulse" input at 252 to the programmable delay line 254 will be seen later (as described hereinafter with reference to FIG. 9) to occur approximately at the center time of each video return during a target scan. The delay line 254 provides a slight delay at its output 256 to accommodate for delays introduced by the buffer amplifiers and the amplifier 214 so that the flip-flop 258 is triggered to provide the "hold" signal at 219 when the video pulse is substantially centered in the delay line 202. The delay line 254 is adjusted or programmed during calibration to provide the precise timing necessary.

The flip-flop 258 also triggers a monostable multivibrator 260 to effect a "convert" signal at the circuit 222 of sufficient duration to assure that the sampled and held value is converted to provide the proper input to the register 230. When the "busy" signal at 262 terminates, it resets the flip-flop 258 and triggers the monostable device 266 through the inverter 264. The monostable device 266 produces a "load" signal at 268 for the registers 234 and 244 which is of sufficient time duration to assure that the data from the circuit 230 is input to the registers 234 and 244. Before the termination of the ΔB time, the data which has been accumulated in the register 234 and loaded into the buffer register 244 is available to the radar computer. With delay provided by the inverter 250, the register 234 is cleared subsequent to the ΔB time.

Figure 9:
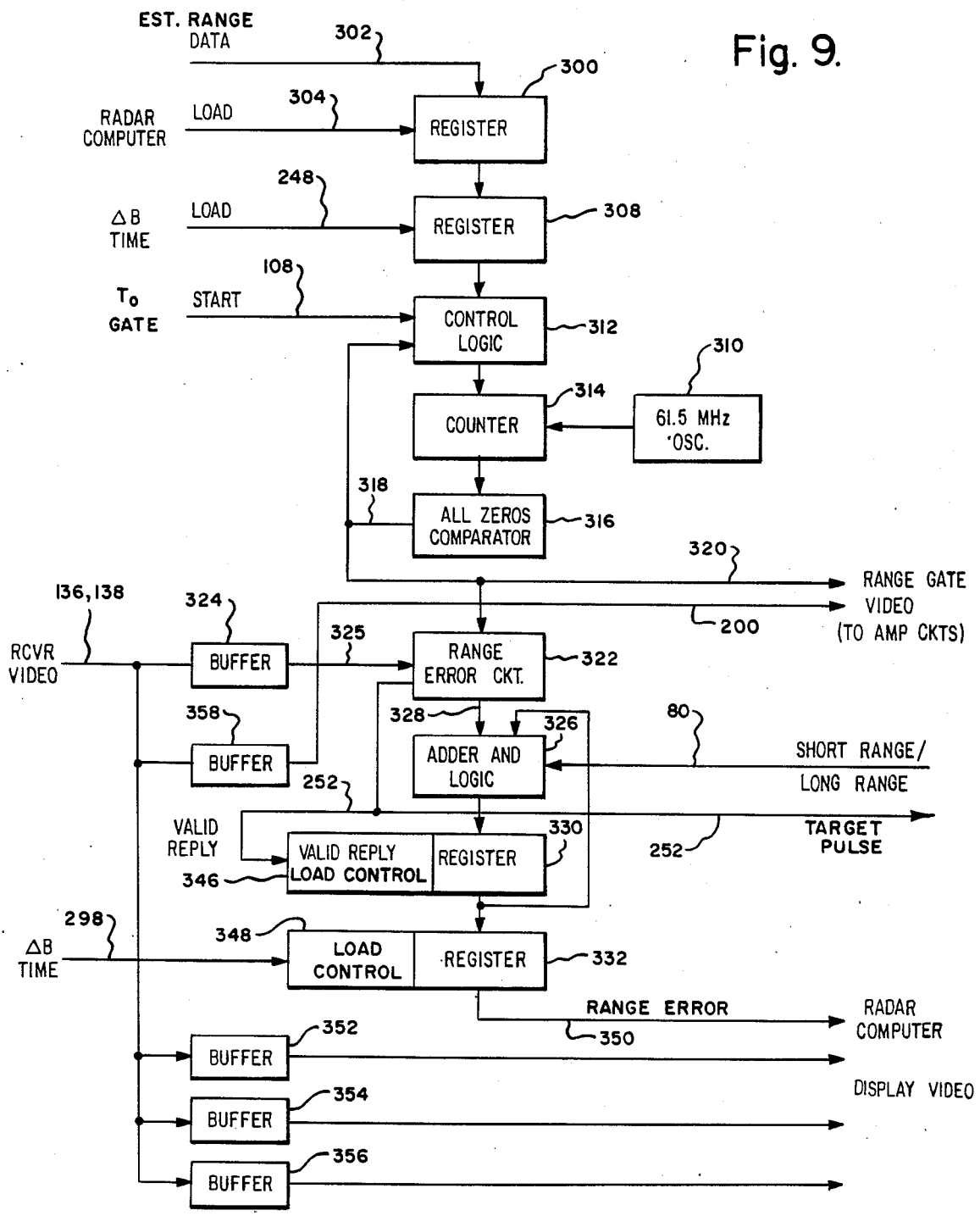
FIG. 9 is a diagram of the range measuring portion of the radar processor.

The range measuring circuit 174 is shown in FIG. 9. Estimated or expected range data is supplied by the radar computer 176 and is input to the register 300 as indicated at 302 and loaded therein as indicated at 304 under control of the computer prior to transmission of the first interrogating pulse at a new target scan. At the end of the previous target scan, this expected range data is loaded into the register 308. Thus, just prior to interrogation at a new target scan, the data in the register 308 is the expected range of the target which, if accurate, is equal to the number of pulses produced by the oscillator 310 from each $T_o$ instant until the middle of the corresponding echo pulse. The logic circuit 312 loads to the counter 314 with a counter number corresponding to the expected range data for each $T_o$ during the target scan. The oscillator 310 starts counting the counter 314 down to zero and when this is detected by the comparator 316, a range gate signal is output at 318. This signal is connected to the circuit 312 to prepare it for the next $T_o$ gate signal, is connected back to the radar computer over the line 320 for reference, and is applied to the range error circuit 322. The error circuit receives the echo pulse through the buffer 324 and determines the time difference, if any, between the period from the leading edge of the 200 nanosecond video echo pulse to the range gate signal time and the period from the range gate signal time to the trailing edge of the echo pulse, bearing in mind that the range gate signal should occur at about the middle of the video pulse. This difference is applied to the adder and logic circuit 326 as indicated at 328 and the output of this circuit is loaded into the register 330. As is the case with the amplitude circuit of FIG. 8, the signal at 80 controls the circuit 326 to add the recirculated contents of the register 330 either thirty times (long range) or six times (short range) so that, ultimately, the register 332 is loaded with the algebraic sum of all range errors at the beam position in question.

The register 330 is loaded only if the video pulse or reply is valid. Thus, if the range gate signal at 318 occurs during the video pulse time, the circuit 322 produces the output at 252 to the valid reply control 346 and the register 330 is thereby loaded in response to each such valid reply. The "valid reply" signal is also output as the "target pulse" in FIG. 8. The circuit 348 is enabled only during the ΔB time as indicated by the input at 306. At the end of ΔB time, the register 330 has accumulated the sum of all the range errors at the corresponding beam position and, at the expiration of the ΔB time, the contents of the register 330 is transferred to register 332 by circuit 348. At a short time later this data is transferred over the line 350 to the radar computer as the range error signal for that beam position.

Neither 346 nor 348 are register or counter circuits by themselves. These points are the control inputs for registers 330 and 332 respectively. The range error circuit, 322 generates the valid reply pulse 252. This pulse is used to load register 330 since at this time the output of the adder and logic 326 is valid. The ΔB time signal is the scan timing which signals the completion of one beam pointing position. It is at that time when the range error data is complete and ready for transfer to the radar computer.

The target pulse output at 252 is due to the coincidence between the range gate input to 322 and the echo pulse at 325. It should be noted that the primary function of the target pulse at 252 is to activate the summation circuits of FIGS. 8 and 9. Where these circuits simply triggered from the echo pulse any return pulse independent of range would trigger these circuits. Since the system can track multiple aircraft on approach only the first or some random combination of aircraft data would be accumulated. This predicted or estimated range coincidence then places a gate or window around the desired echo and stops echos from other targets or noise from upsetting the desired measurement. The output from the range error circuit, line 350, is used to update the estimated range so the complete system tracks the desired target.

In addition to the above, FIG. 9 shows the three video display buffers 352, 354 and 356 and the video buffer 358 which provides the video input at 200 to the amplitude measuring circuit of FIG. 8. As is the case for the buffer 324, these are not functional portions of the range circuit.

The antenna system employed consists of a planar array of twenty-element subarrays. Each subarray comprises a matrix of E-plane sectoral horns arranged in a rectangular distribution of five horns horizontally and four horns vertically. The subarrays are arranged, in turn, in a rectangular distribution of eighteen vertical columns each containing a stack of ten subarrays. This arrangement allows the simple power distribution illustrated in FIG. 11. Three columns of subarrays are indicated at 400, 402 and 404, the remaining fifteen columns having been omitted for clarity. As noted each column contains a stack of ten subarrays in elevation and the columns are distributed in the azimuth direction. The antenna input port is indicated at 406 to the 4-way waveguide power divider 408 whose four output ports 410, 412, 414 and 416 are input respectively to the 5-way waveguide power divider 418, the 4 way waveguide power dividers 420 and 422 and the 5-way divider 424. The power divider 418 feeds the 10-way waveguide power dividers 426, 428, 430, 432 and 434 over the ports 436, 438, 440, 442 and 444 whereas the divider 424 similarly feeds the 10-way dividers 446, 448, 450, 452 and 454 over the ports 456, 458, 460, 462 and 464. The two 4-way dividers 420 and 422 will be seen to feed the 10-way dividers 466, 468, 470, 472, 474, 476, 478 and 480 over the respective ports 482, 484, 486, 488, 490, 492, 494 and 496. Each column of each subarray is fed from the ten output ports of a corresponding 10-way divider as is illustrated by the ten ports 498 for the subarrays 402.

Figure 12:
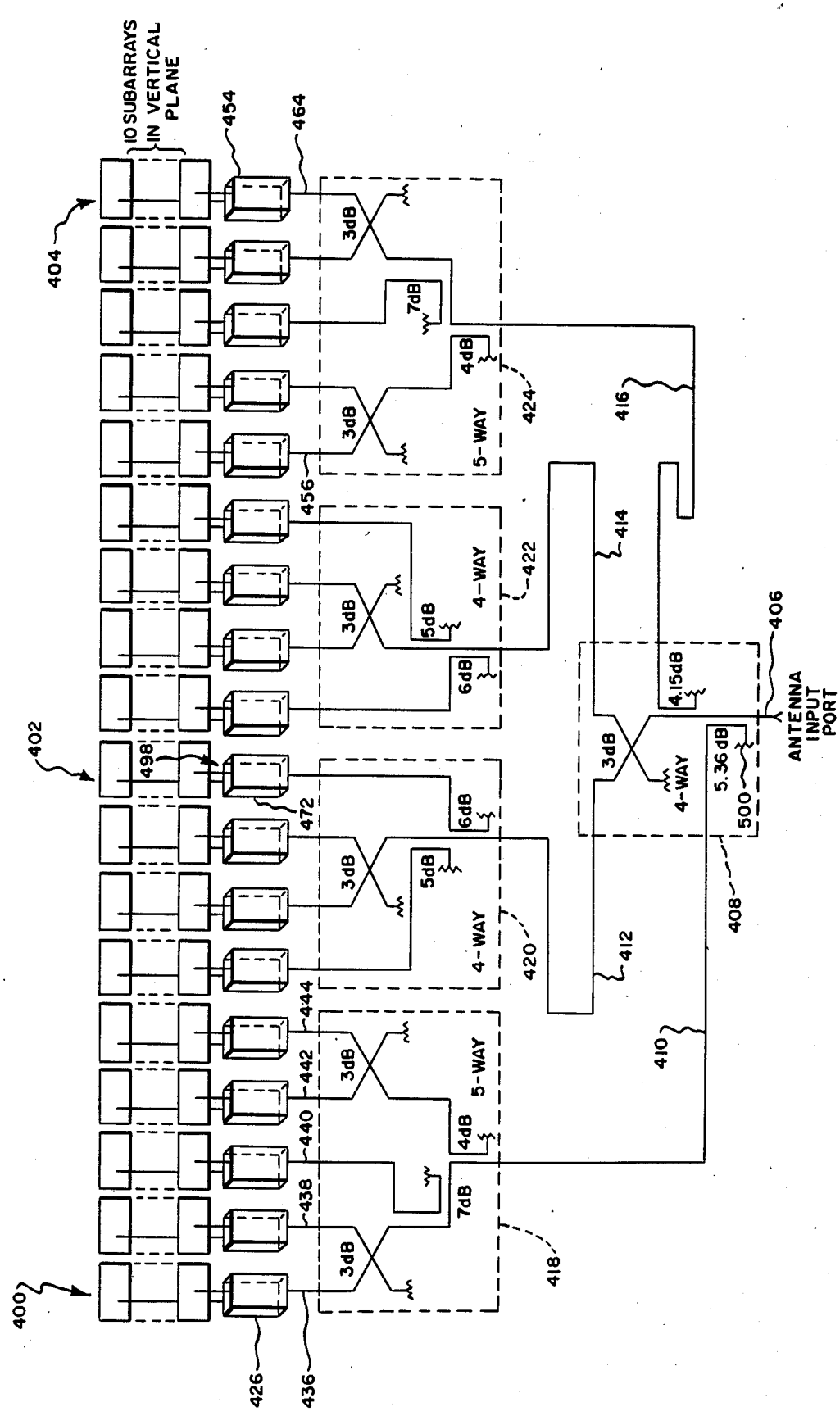
FIG. 12 is a diagram of a portion of the antenna system.

FIG. 12 shows electrical details of the 4-way divider 408 as well as the two 5-way dividers 418, 42 and the two 4-way dividers 420, 422 which it feeds. The symbols such as that indicated by the reference character 500 in FIG. 12 in the 4-way power divider 408 is used to represent a termination. The waveguide used is silver plated WR62 waveguide to provide low loss (6 dB per 100 ft) in the distribution feed. The power divider network provides a uniform amplitude distribution to the subarrays in the azimuth direction, as shown.

Figure 13:
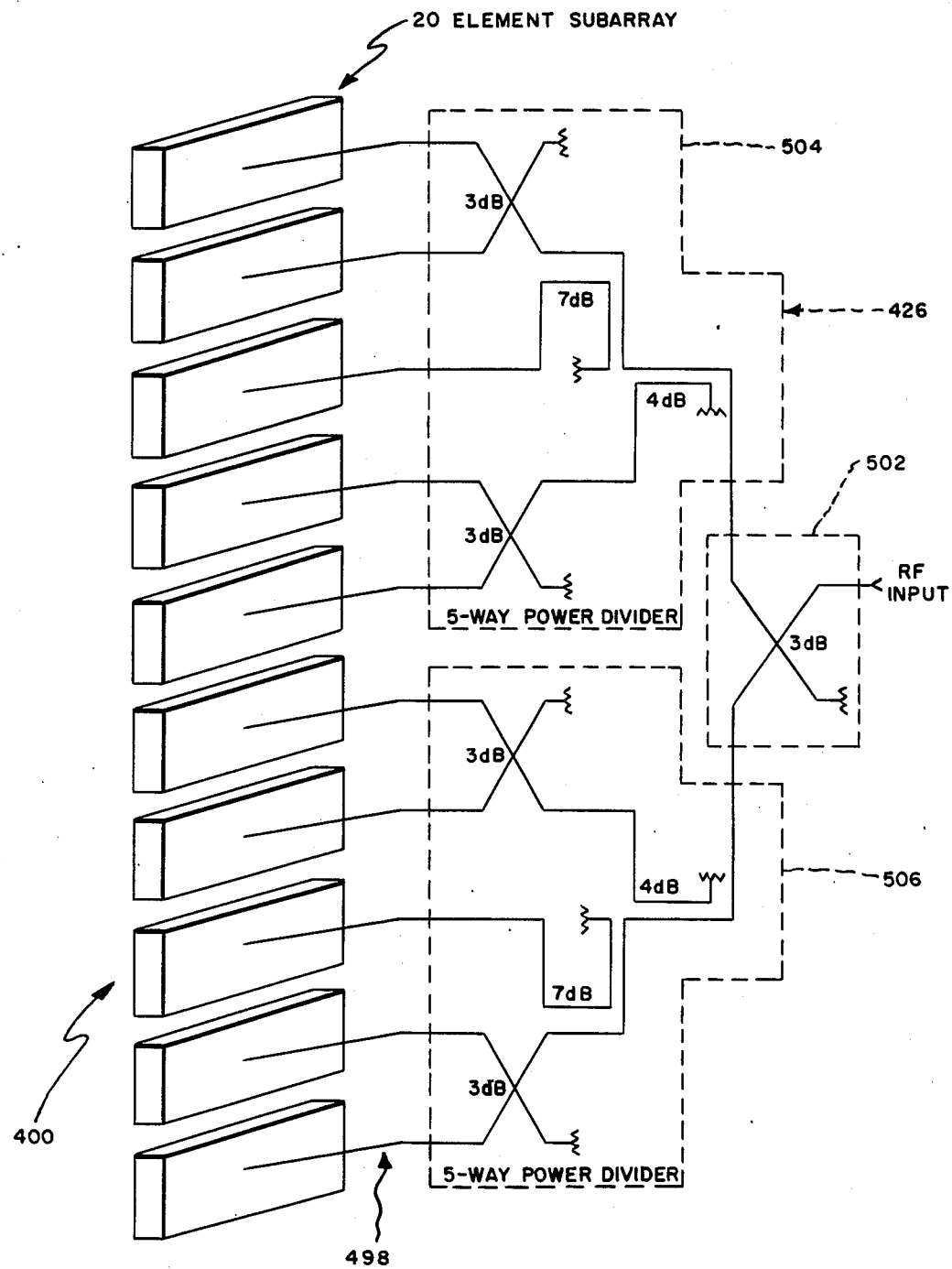
FIG. 13 is a diagram of another portion of the antenna system.
Figure 14:
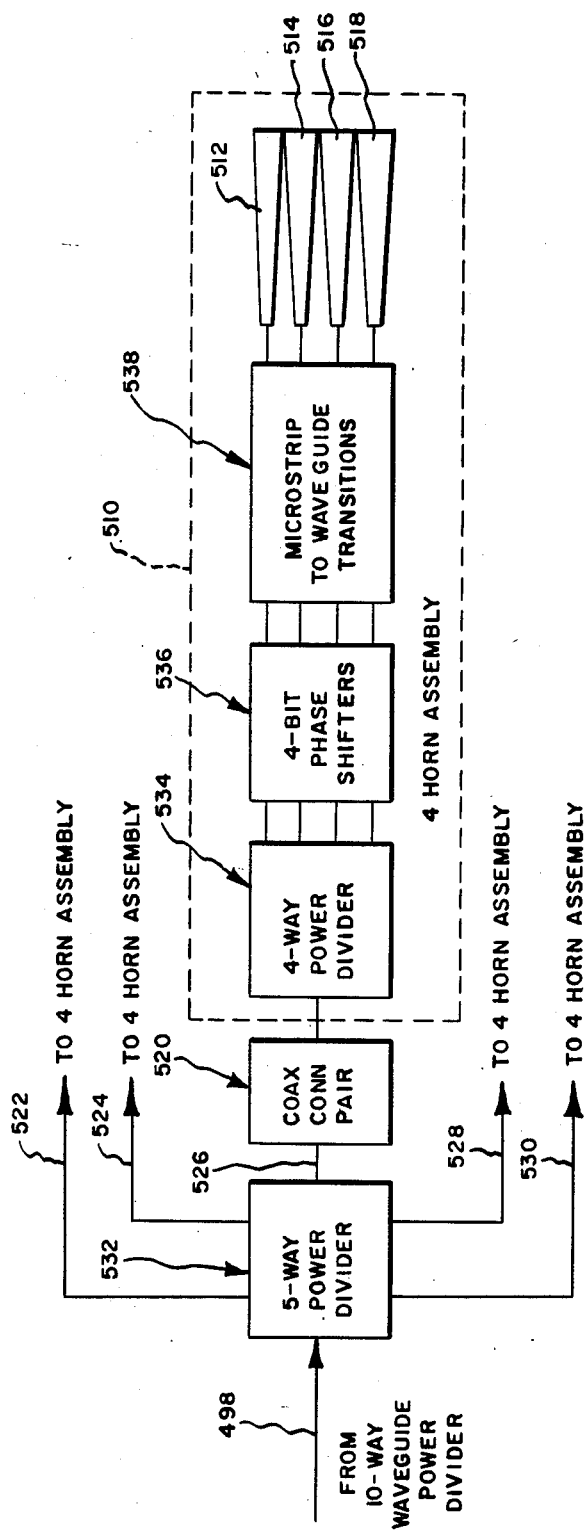
FIG. 14 is a block diagram of a subarray of the antenna system.

FIG. 13 illustrates the electrical details of a 10-way power divider such as the divider 426 which feeds a column of subarrays 400. As shown, each 10-way divider includes a 3 dB hybrid 502 feeding two 5-way power dividers 504 and 506. Again, the waveguide is silver plated WR62 and a uniform amplitude distribution is effected in the elevation plane for each column.

The power divider network used to provide the azimuth and elevation feed distribution employs combinations of branch line, short slot and multihole coupling. The coupling values are selected to provide the desired amplitude tapers, as indicated, in both the azimuth and elevation planes. Trombone sections and waveguide meander sections are used to achieve phase matching at the various output ports, the total insertion loss to each of the columns 400, etc. is approximatly 0.5 dB.

Figure 11:
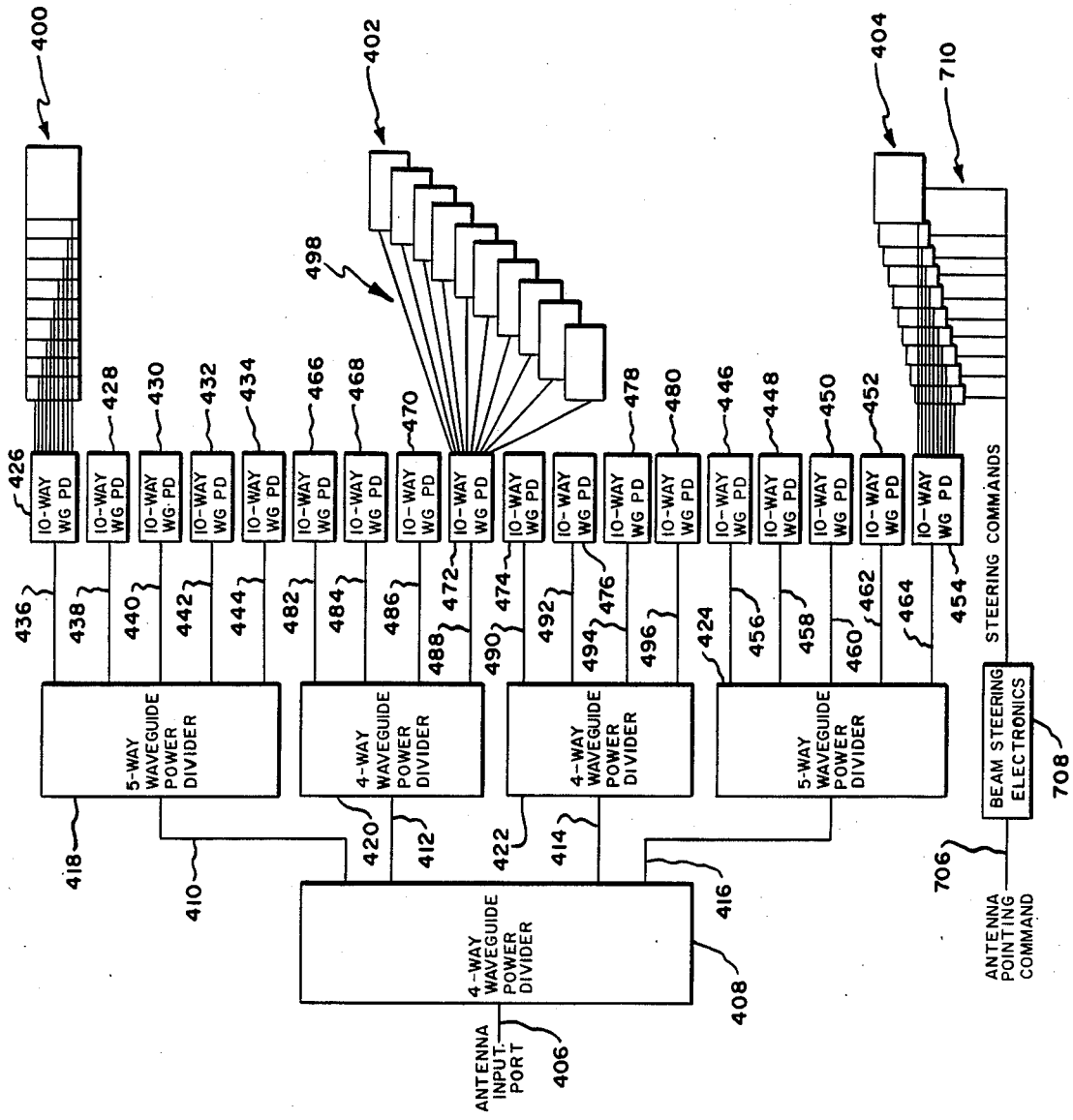
FIG. 11 is a block diagram of the antenna system.

FIG. 11 diagrammmatically illustrates the arrangement at each subarray. One four-horn component of a subarray is indicated within the dashed line box 510 and will be seen to include the four horns 512, 514, 516 and 518. The input to each of the five components 510 of the subarray is by a coaxial connector pair as indicated at 520 from each output port 522, 524, 526, 528 or 530 of the 5-way power divider 532. Because of dimensional constraints, the circuit 532 is of stripline form having output connections (i.e., at 522, etc.) orthogonal to the plane of the circuit network. Again, because of dimensional restrictions, the 4-way power divider 534 and 4-bit phase shifter circuit 536 are of microstrip construction with an integral shielded microstrip-to-waveguide transition as symbolically indicated at 538 and which provides the 90° rotation required to excite the $TE_{10}$ mode in the waveguide feed to the horns. This waveguide feed is WR42 waveguide because of the dimensional requirements of the horns as later described.

Figure 15:
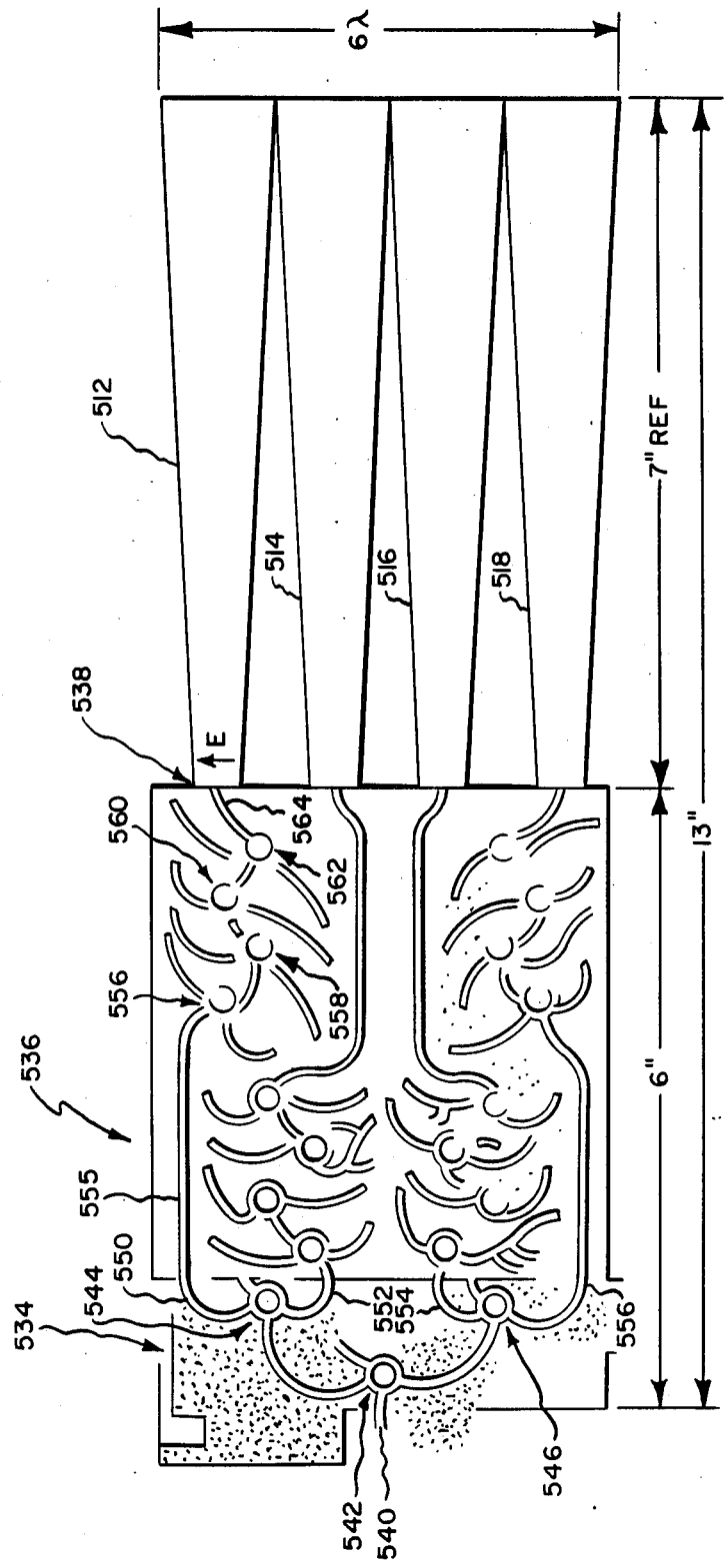
FIG. 15 is a section through a subarray.

FIG. 15 is a section through a subarray component 510 and illustrates the general arrangement both of the power divider 534 and of the phase shifter section 536. The signal path from the input port 540 to one of the horn elements will illustrate the principles involved. The 3 dB hybrids 542, 544 and 546 divide the power equally to the ports 550, 552, 554 and 556. For the path to and from the horn 512, same includes the connection 555 to the port 550, the phase bits 556, 558, 560 and 562 and the port 564 coupling to the horn feed. Each phase bit is of the reciprocal, reflective type employing a 3 dB hydrid, two PIN diodes, an impedance transformation network and a biasing network as illustrated in FIG. 16.

Figure 16:
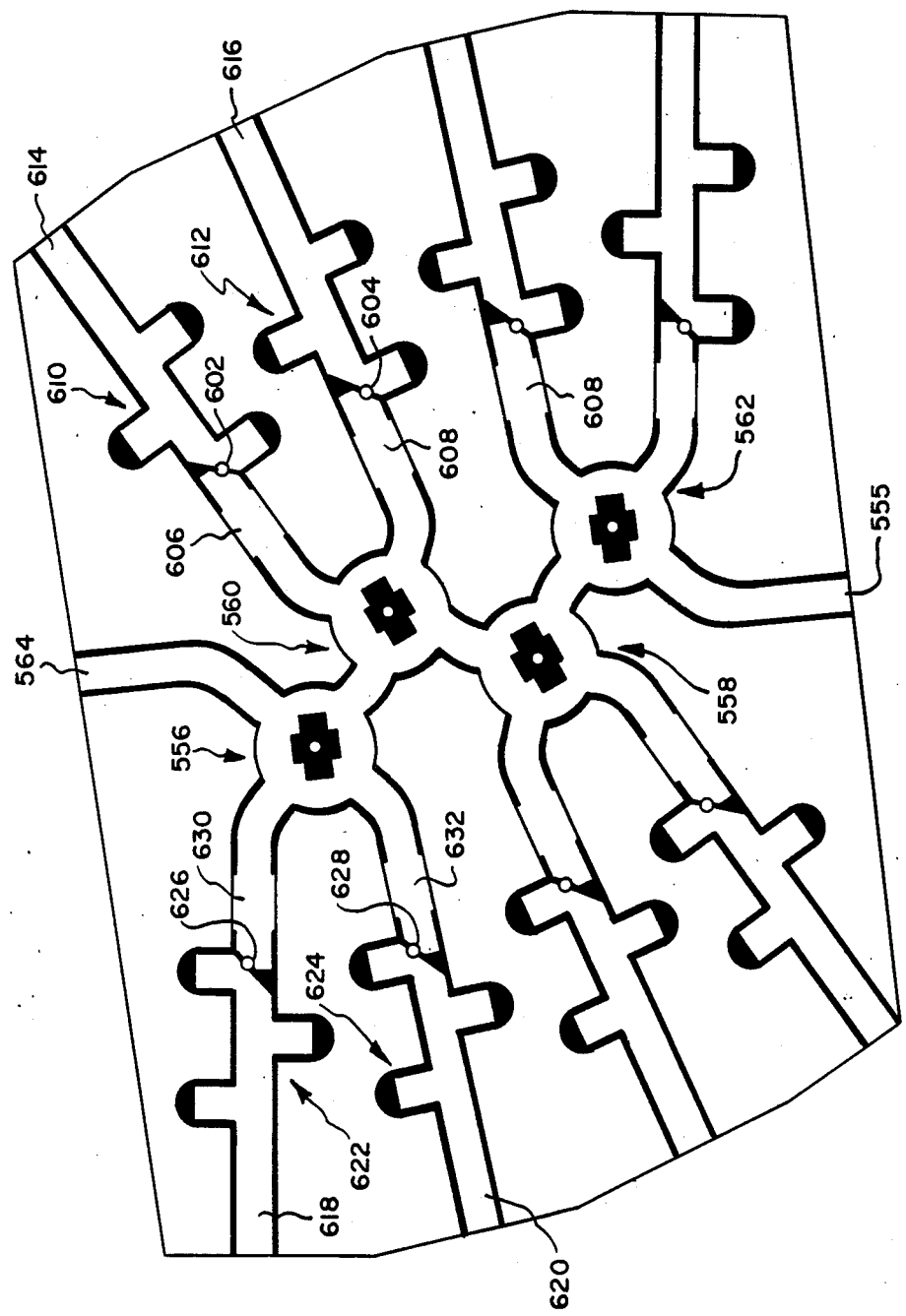
FIG. 16 is a diagram illustrating details of a phase bit.

One of the 4-bit phase shifters which provides 180°, 90° 45°, and 22.5° shifts with a 2.0 dB insertion lbss in all phase states is shown in FIG. 16. The phase shifter shown is of the reflective type and illustrates, for example, the 4 phase bits 556, 558, 560 and 562 shown in FIG. 15. Considering the phase shifter 560, same includes the 3 dB hybrid 600, the PIN diodes 602 and 604, the impedance transformers 606 and 608 and the RF short to ground at one diode terminal operating as a band stop filter indicated generally by the reference character 610 and 612 and constituting the DC bias ports. That is to say, the DC control signal is applied to the microstrip sections 614 and 616 and are connected to one terminal of the respective diodes 602 and 604. The diodes 602 and 604 are mounted across the microstrip portions 606 and 614 and 608 and 616. In the particular layout shown, the phase shifter 556 with its DC controls at 618 and 620, band stop filters 622 and 624, diodes 626 and 628 and impedance transformers 630 and 632 is the 45° shifter whereas 558 is the 22.5° shifter, 560 is the 90° shifter and 562 is the 180° shifter.

Figure 17:
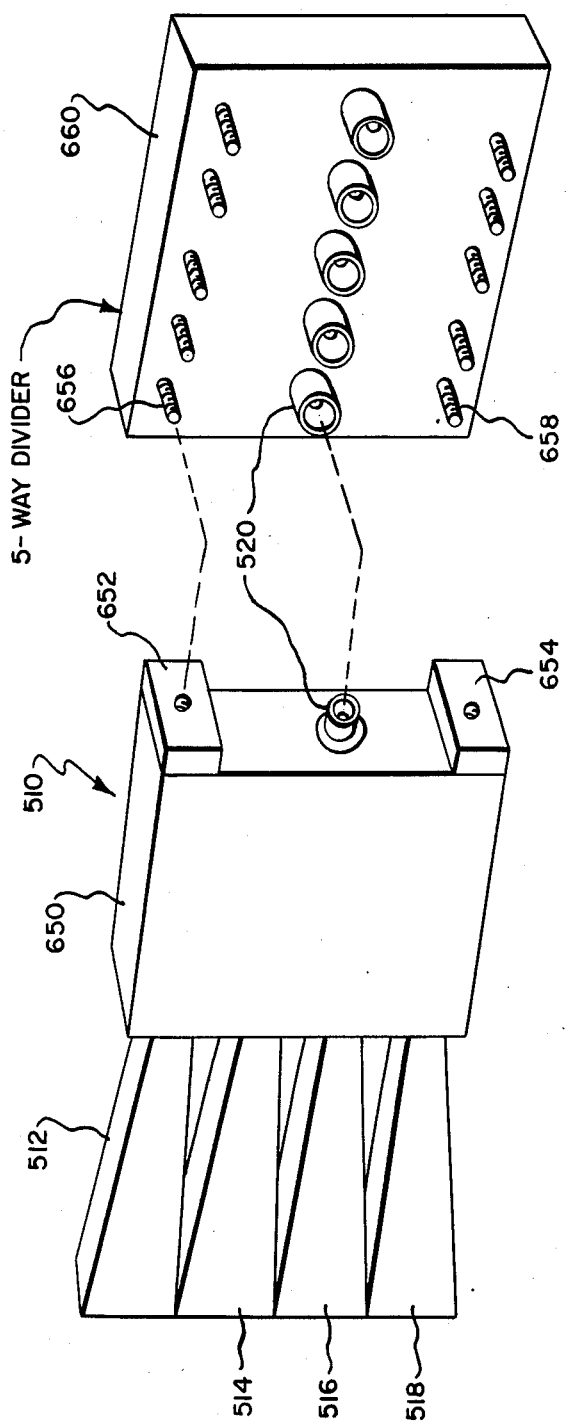
FIG. 17 is an exploded perspective of portions of a subarray.
Figure 18:
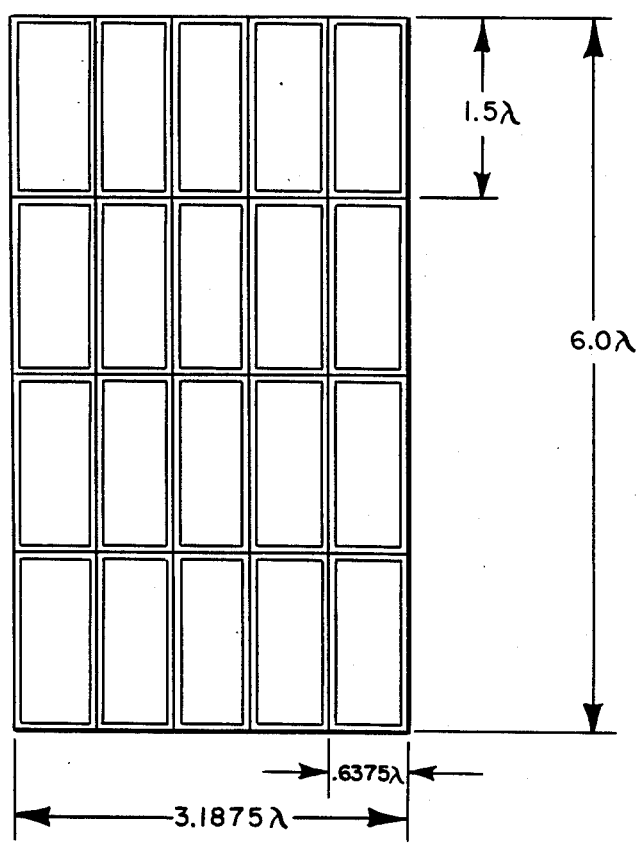
FIG. 18 is a front elevation of a subarray.

FIG. 17 illustrates the arrangement of a subarray. The component 510 which includes the body portion 650 containing the entities 534, 536 and 538 and the mounting for the four horns as shown is also provided, with the coaxial input of one coaxial pair 520 and the mounting pads 652 and 654 which receive the fasteners 656 and 658 passing through the body 660 housing the 5-way divider 532. Five of the component 510 are mated to the body 610 with coupling through the appropriate coaxial connector pairs. A front view of the assembled subarray is shown in FIG. 18 and illustrates certain dimensional relationships. For example, from the WR42 feed end of each horn, each horn flares in the E plane at an angle of 13.6° to provide optimum matching at the center frequency of 15.55 GHz. The end of each horn is dimensioned 1.5λ in the E plane and 0.6375λ in the H plane so that each subarray is of 7.5λ by 3.1875λ size as shown. The full array is thus 60λ (vertical) by 57.4λ (horizontal) in size. Each horn has a VSWR which varies from 1.28 to 1.55 over the band 15.4–15.7 GHz, a gain of 11 dB and a maximum sidelobe level 15 dB below the main beam.

Figure 10:
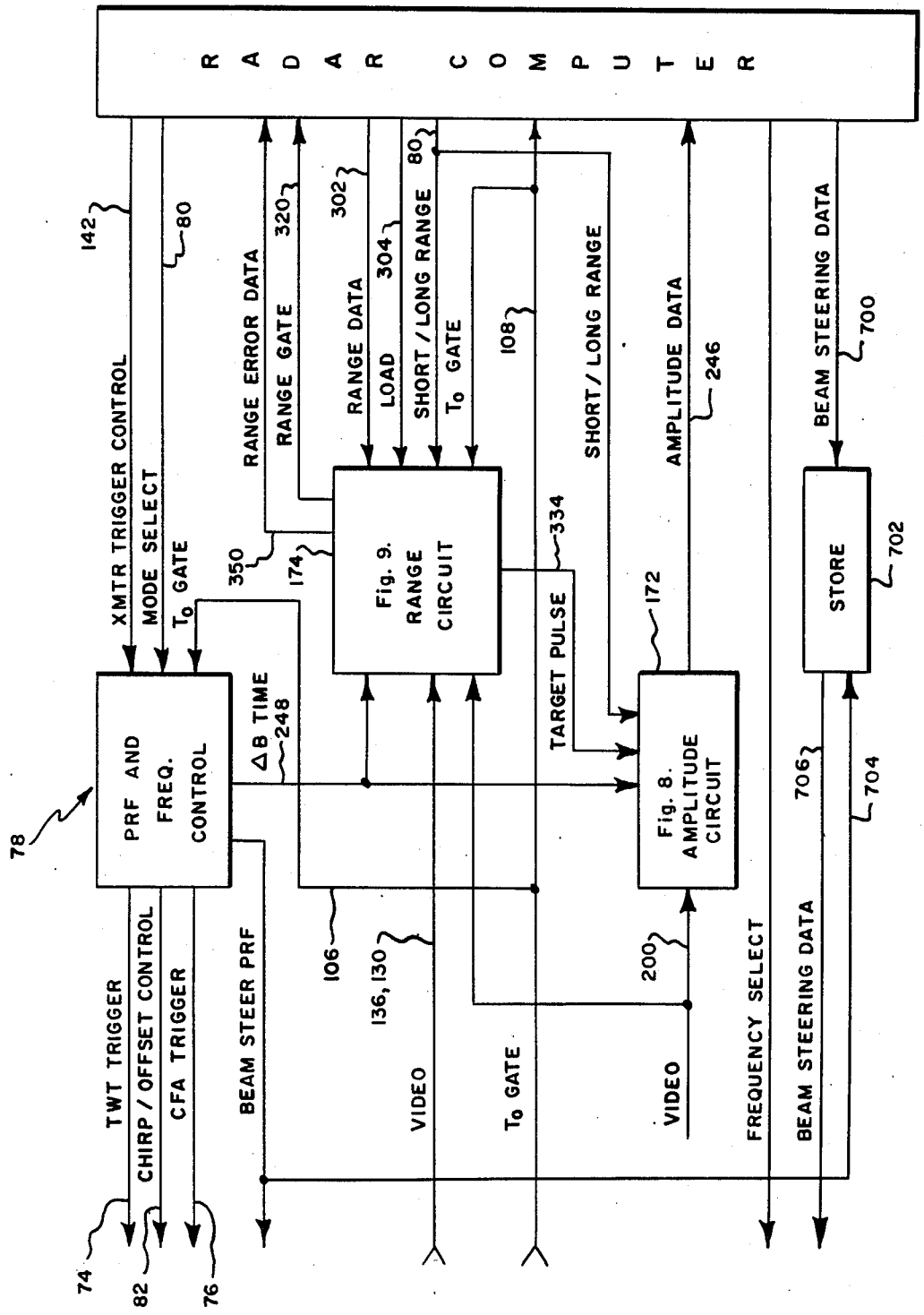
FIG. 10 is a block diagram illustrating principal functions of the radar processor.

The beam steering is controlled by the radar computer as is shown in FIGS. 7 and 10. The beam steering data is output as indicated at 700 to the store 702 and it is output from the store 702 under control of the beam steering PRF signal as indicated at 704 in FIG. 10. This output data, at 706, is applied to the beam steering circuits 708 (FIG. 11) from which the beam steering commands are applied to the subarrays as indicated at 710 in FIG. 11.

The beam steering electronics is illustrated in FIG. 19 and will be seen to include the interface circuit 800, the scan pattern control circuit 802, the scan sequencer 804 and a plurality (forty-five) of phase bit commanding circuits 806 controlling a corresponding number of phase shifter circuits 808. Each of the circuits 806 includes an element phase processor section 810, a scan memory 812 and a phase error detection circuit 814. It is to be noted that each of the phase shifter blocks 816, 818, 820 and 822 contains all of the phase shifters for one subarray so that each phase shifter circuit 808 services four subarrays. Thus, forty-five circuits 808 and a corresponding number of circuits 806 are required for the complete array.

Details of the circuits 810 and 812 are illustrated in FIG. 20.

From FIG. 19, it will be seen that the data at 706 includes frequency, azimuth angle ($\phi$), elevation angle ($\theta$) and range data. The frequency data is input to the circuits 810 at 824 whereas the angles data are input at 826. It will be appreciated that the angles data at 828 as well as the range data at 829 are the estimated target data from the radar computer, which corresponding data is input to the pattern control circuit 802.

The element phase equation is:

$$\frac{\psi}{2\pi} = \frac{f}{c} \cos\theta[(nC_x + X_m)\tan\theta + mC_y\sin\phi] + R$$

where f is frequency, n is element vertical location, m is element horizontal location, X is subarray column stagger function, R is element phase compensation, C is element vertical spacing, C is element horizontal spacing, is elevation angle, $\phi$ is azimuth angle and c is propogation velocity. The three PROMs 830, 832 and 834, the adder 836 and the multiplier 838 are employed to provide the element phase output (less compensation) at 840, the PROM 842 and adder 844 completing the element phase equation to produce the command and output at 846 which is applied to the scan memory 812.

It will be appreciated that the system disclosed above is particularly suited to effect automatic landing aboard aircraft carriers at sea without requiring the target aircraft to employ transponders, corner reflectors or the like. A plurality of aircraft may be handled simultaneously to effect the proper control and successive landings thereof under commands generated at the carrier and transmitted by radio link to the various aircraft involved.

Whereas a preferred embodiment of the invention has been disclosed, it is to be understood that various modifications may be made thereto within the purview of the following claims.

What is claimed is:

1. The method of automatically landing aircraft aboard a carrier at sea which comprises the steps of:
    (a) electronically controlling a radar system aboard the carrier to scan by means of a pencil beam which is incrementally steered to positions coarsely filling a space-stabilized volume which defines an acquisition window at a long range position from the carrier;
    (b) repetitively illuminating an aircraft entering said acquisition window with pulses of electromagnetic radiation at a plurality of different frequencies at each of a small number of said incremental beam positions and receiving the echoes returned by the aircraft;
    (c) determining aircraft range and the vertical and lateral position errors of the aircraft with respect to a desired landing path from said echoes;
    (d) automatically controlling the aircraft to reduce said vertical and lateral aircraft position errors;
    (e) periodically repeating steps (a)-(d) until the aircraft is at a predetermined close range; then
    (f) electronically controlling the radar system to scan the aircraft at an expanded number of said beam positions sufficient to cover the aircraft completely based upon estimated range of the aircraft;
    (g) repetitively illuminating the aircraft with chirp pulses of electromagnetic radiation at said expanded number of beam positions and receiving the echoes returned by the aircraft;
    (h) determining aircraft range and the vertical and lateral position errors of the aircraft with respect to said desired landing path from said echoes received in step (g);
    (i) automatically controlling the aircraft to reduce the errors determined in step (h);
    (j) periodically repeating steps (f)-(i) until the aircraft is very near to touchdown; and then
    (k) freezing the automatic control until touchdown.

2. A skin-tracking radar system which comprises transmitter means for generating illuminating pulses having different frequencies, receiver means for producing video signals representing echo returns from said illuminating pulses having different frequencies, antenna means for scanning a space stabilized volume at a large number of fixed points, said transmitter means and said receiver means being connected to said antenna means, beam sterring means connected to said antenna means for causing said antenna means to illuminate said fixed volume by steering a beam stepwise to said large number of beam positions, computer means for simultaneously controlling said transmitter means, said receiver means and said beam steering means for causing said transmitter means to generate said illuminating pulses at each of said beam positions before said steering means steers the beam to the next stepwise beam position, for periodically causing a small number of said beam positions which cover a target to be scanned by said illuminating pulses having different frequencies, for summing the amplitudes of all the echo returns at each of said small number of beam position and computing the location of a centralized point of the target cross section based upon the sums of said amplitudes.

3. A skin-tracking radar system as defined in claim 2 wherein the location of said centralized point is computed by equal area distribution of the area defined by the amplitude scans versus angle in both the azimuth and elevation planes.

4. A skin-tracking radar system which comprises transmitter means for generating illuminating pulses having different frequencies, receiver means for producing video signals representing echo returns from said illuminating pulses having different frequencies, antenna means for scanning a space stabilized volume at a large number of fixed points, said transmitter means and said receiver means being connected to said antenna means, beam steering means connected to said antenna means for causing said antenna means to illuminate said fixed volume by steering a beam stepwise to said large number of beam positions, computer means for simultaneously controlling said transmitter means, said receiver means and said beam steering means for periodically causing a small number of said beam positions which cover a target to be scanned by said illuminating pulses having different frequencies, for summing the amplitudes of all the echo returns at each of said small number of beam position and computing the location of a centralized point of the target cross section based upon the sums of said amplitudes, the location of said centralized point being computed by summing the products of the sums of columns of raster points and their corresponding azimuth angles referenced to a point within the raster and dividing the sums of such products by the sum of the column amplitudes to determine azimuth angular displacement of the centralized point from said point in the raster, and by summing the products of the sums of rows of raster points and their corresponding elevation angles referenced to said point within the raster and dividing the sums of such products by the sum of the row amplitude to determine angular displacement of the centralized point from said point in the raster.

5. A skin-tracking radar system as defined in claim 4 wherein said point in the raster is chosen closed to the predicted location of said centralized point.

6. A skin tracking radar system as defined in claim 2 wherein said antenna means illuminates said volume with a symmetrical pencil beam at each raster point.

7. A skin-tracking radar system as defined in claim 6 wherein said pencil beam is of 1° 3 dB beamwidth and said beam steering means steps said pencil beam in $\frac{1}{2}$° steps.

8. A skin-tracking radar system as defined in claim 2 wherein said computer means controls said beam steering means to cover rasters of different sizes dependent upon predicted range of the target.

9. A skin-tracking radar system as defined in claim 8 wherein the raster size is four beam positions for predicted ranges greater than a predetermined range and is stepwise increased in size at predicted ranges less than said predetermined range.

10. A skin-tracking radar system as defined in claim 9 wherein each target scan is effected in a fixed time which is sufficiently short to assure that the target is essentially frozen in position during each scan.

11. A skin-tracking radar system as defined in claim 10 wherein each target scan time is about ten milliseconds.

12. A skin-tracking radar system as defined in claim 2 wherein said antenna means is fixed to an aircraft carrier and including means for sensing motions of the carrier in six degrees of freedom, said computer means being connected to said means for sensing for controlling said beam steering means to maintain the space stabilization of said beam positions.

13. A skin-tracking radar system as defined in claim 1 including data transmitter means for controlling an aircraft autopilot to fly an aircraft to and along a selected landing path onto the aircraft carrier.

14. A skin-tracking radar system as defined in claim 12 wherein the location of said centralized point is computed by equal area distribution of the area defined by the amplitude scans versus angle in both the azimuth and elevation planes.

15. A skin-tracking radar system as defined in claim 13 wherein the location of said centralized point is computed by equal area distribution of the area defined by the amplitude scans versus angle in both the azimuth and elevation planes.

16. A skin-tracking radar system which comprises transmitter means for generating illuminating pulses having different frequencies, receiver means for producing video signals representing echo returns from said illuminating pulses having different frequencies, antenna means for scanning a space stabilized volume at a large number of fixed points, said transmitter means and said receiver means being connected to said antenna means, beam steering means connected to said antenna means for causing said antenna means to illuminate said fixed volume by steering a beam stepwise to said large number of beam positions, computer means for simultaneously controlling said transmitter means, said receiver means and said beam steering means for periodically causing a small number of said beam positions which cover a target to be scanned by said illuminating pulses having different frequencies, for summing the amplitudes of all the echo returns at each of said small number of beam position and computing the location of a centralized point of the target cross section based upon the sums of said amplitudes, said antenna means being fixed to an aircraft carrier and including means for sensing motions of the carrier in six degrees of freedom, said computer means being connected to said means for sensing for controlling said beam steering means to maintain the space stabilization of said beam positions the location of said centralized point being computed by summing the products of the sums of columns of raster points and their corresponding azimuth angles references to a point within the raster and dividing the sums of such products by the sum of the column amplitudes to determine azimuth angular displacement of the centralized point from said point in the raster, and by summing the products of the sums of rows of raster points and their corresponding elevation angles referenced to said point within the raster and dividing the sums of such products by the sum of the row amplitude to determine angular displacement of the centralized point from said point within the raster.

17. A skin-tracking radar system which comprises transmitter means for generating illuminating pulses having different frequencies, receiver means for producing video signals representing echo returns from said illuminating pulses having different frequencies, antenna means for scanning a space stabilized volume at a large number of fixed points, said transmitter means and said receiver means being connected to said antenna means, beam steering means connected to said antenna means for causing said antenna means to illuminate said fixed volume by steering a beam stepwise to said large number of beam positions, computer means for simultaneously controlling said transmitter means, said receiver means and said beam steering means for periodically causing a small number of said beam positions which cover a target to be scanned by said illuminating pulses having different frequencies, for summing the amplitudes of all the echo returns at each of said small number of beam position and computing the location of a centralized point of the target cross section based upon the sums of said amplitudes, data transmitter means for controlling an aircraft autopilot to fly an aircraft to and along a selected landing path onto the aircraft carrier, the location of said centralized point being computed by summing the products of the sums of columns of raster points and their corresponding azimuth angles referenced to a point within the raster and dividing the sums of such products by the sum of the column amplitudes to determine azimuth angular displacement of the centralized point from said point in the raster, and by summing the products of the sums of rows of raster points and their corresponding elevation angles referenced to said point within the raster and dividing the sums of such products by the sum of the row amplitude to determine angular displacement of the centralized point from said point in the raster.

18. A skin-tracking radar system as defined in claim 16 wherein said point in the raster is chosen close to the predicted location of said centralized point.

19. A skin-tracking radar system as defined in claim 17 wherein said point in the raster is chosen close to the predicted location of said centralized point.

20. A skin-tracking radar system as defined in claim 12 wherein said antenna means illuminates said volume with a symmetrical pencil beam at each raster point.

21. A skin-tracking radar system as defined in claim 13 wherein said antenna means illuminates said volume with a symmetrical pencil beam at each raster point.

22. A skin-tracking radar system as defined in claim 20 wherein said pencil beam is of 1° 3 dB beamwidth and said beam steering means steps said pencil beam in $\frac{1}{2}$° steps.

23. A skin-tracking radar system as defined in claim 21 wherein said pencil beam is of 1° 3 dB beamwidth and said beam steering means steps said pencil beam in $\frac{1}{2}$° steps.

24. A skin-tracking radar system as defined in claim 12 wherein said computer means controls said beam steering means to cover rasters of different sizes dependent upon predicted range of the target.

25. A skin-tracking radar system as defined in claim 13 wherein said computer means controls said beam steering means to cover rasters of different sizes dependent upon predicted range of the target.

26. A skin-tracking radar system as defined in claim 24 wherein the raster size is four beam positions for predicted ranges greater than a predetermined range and is stepwise increased in size at predicted ranges less than said predetermined range.

27. A skin-tracking radar system as defined in claim 25 wherein the raster size is four beam positions for predicted ranges greater than a predetermined range and is stepwise increased in size at predicted ranges less than said predetermined range.

28. A skin-tracking radar system as defined in claim 26 wherein each target scan is effected in a fixed time which is sufficiently short to assure that the target is essentially frozen in position during each scan.

29. A skin-tracking radar system as defined in claim 27 wherein each target scan is effected in a fixed time which is sufficiently short to assure that the target is essentially frozen in position during each scan.

30. A skin-tracking radar system as defined in claim 28 wherein each target scan time is about ten milliseconds.

31. A skin-tracking radar system as defined in claim 29 wherein each target scan time is about ten millisecond.

32. A skin-tracking radar system as defined in claim 2 wherein said antenna means is an electronically steered planar phased array.

33. A skin-tracking radar system as defined in claim 32 wherein said planar phased array comprises a plurality of side-by-side vertical columns of subarrays.

34. A skin-tracking radar system as defined in claim 33 wherein each subarray comprises an integrated module comprising groups of E plane sectoral horns, each group having a body mounting its horns and containing a 4-bit phase shifter for each horn and a power divider for feeding the plane shifters of all of its horns, and each module including a power divider joining the bodies of the groups of horns and coaxially feeding the power dividers in such bodies.

35. The method of effecting automatic landing of an aircraft on the flight deck of an aircraft carrier which comprises the steps of:

(a) providing an electronically steered phased array antenna at a fixed position on an aircraft carrier, which antenna is capable of steering its beam to a wide area of potential beam positions which are fixed relative to said carrier and are thus subjected to ship motions;

(b) repetitively scanning a space-stablilized pattern of beam positions within the confines of said wide area so as to cover an acquisition window at far range from the aircraft carrier and detecting aircraft entering such window;

(c) repetitively scanning, at a plurality of frequencies, each of a small number of beam positions within said pattern which bracket the expected position of a detected aircraft and updating the expected position therefrom;

(d) periodically increasing the number of said small number of beam positions in step (c) as a function of expected range of the detected aircraft; and (e) remotely controlling the detected aircraft based upon updated expected positions thereof to fly to and along a selected landing path which intersects the carrier flight deck.

36. The method as defined in claim 35 wherein said small number of beam positions is four.

37. The method of skin tracking a radar target, which comprises the steps of:

a. steering a radar interrogating beam repetitively to cover a having a finite number of overlapping interrogating areas, the area covered by the interrogating beam at each interrogating area being greater than the radar cross-sectional area of a potential target entering the window;

b. interrogating each interrogating area with a number of pulses of diverse frequencies to minimize target scintillation and at a transmission prf of such number of pulses sufficient to freeze a potential target;

c. detecting a target;

d. interrogating a plurality of adjacent interrogating areas which bracket the detected target at said transmission prf during subsequent scans, and in superimposed relation thereto, until the range of the detected target has decreased so that the plurality of adjacent interrogating areas are insufficient to encompass the radar cross-sectional area of the detected target; and then e. increasing the number of interrogating areas to encompass the radar cross-sectional area of the detected target and interrogating each such increased number of interrogating areas during subsequent scans, and in superimposed relation thereto, with a small number of frequency diversity pulses, less than the number of pulses of step b, at a transmission prf sufficient to freeze the detected target but decreased relative to the transmission prf of step d by said small number;

the interrogations during steps d and e including computation of the actual position of the detected target from the frequency diverse echo returns from the detected target at each of the target interrogating areas.

38. The method as defined in claim 37 wherein the plurality of bracketing interrogating pulses of step d is at least three.

39. The method as defined in claim 38 wherein the increased number of interrogating areas of step e is six.

40. The method as defined in claim 39 wherein the number of interrogating areas of step e is progressively increased as an inverse function of range.

41. The method as defined in claim 37 wherein the number of interrogating areas of step e is progressively increased as an inverse function of range.

42. In a method of skin tracking a radar target, the steps of:
  a. repetitively scanning a large raster of beam positions by steering an illuminating beam stepwise to point the beam successively through a fixed sequence cf the large raster of beam positions;
  b. transmitting rf energy at a number of different frequencies at each beam position to cover a large band of frequencies before steering the beam stepwise to the next position in the fixed sequence of the large raster of beam positions; and
  c. acquiring a target and then altering the scanning of step a s1teer the beam positions successively through a small raster of beam positions comprising at least three overlapping beam positions which bracket the acquired target before steering the beam stepwise to said next position while continuing transmission as in step b to cover a large band of frequencies at each beam position of the small raster of beam positions.

43. In the method defined in claim 42 wherein said three adjacent, overlapping beam positions encompass two beam positions separated one half beamwidth in azimuth and one beam position separated one half beamwidth in elevation from the two beam positions.

44. In the method defined in claim 42 including the step of stepwise increasing the number of overlapping beam positions of step c as a function of inverse range to the acquired target.

45. In the method as defined in claim 44 wherein the stepwise increase in the number of beam positions of step c is accompanied by transmitting the rf energy as a number of chirps cumulatively covering the large band of frequencies.

46. In the method as defined in claim 45 wherein the transmissions of steps b and c are at a large number of discrete frequencies prior to the stepwise increase in the number of beam positions.

47. In an automatic landing system for aircraft, the combination of:
  a planar, phased array antenna oapable of producing a pencil beam which may be steered;
  steering means for causing said antenna repetitively to point its beam stepwise successively through a fixed sequence of a raster of beam positions;
  transmitter means for causing the antenna to transmit rf energy at a plurality of different frequencies covering a large frequency band at each beam position before the beam is steered stepwise to a next position;
  means for detecting and acquiring a target and for determining its range;
  means responsive to target acquisition and connected to said steering means for steering the beam successively through at least three overlapping beam positions which bracket the acquired target before steering the beam stepwise to a next position in the fixed sequence of the raster of beam positions; and
  means for receiving target echos over said frequency band from the overlapping beam positions and for tracking the target with minimal error due to target scintillation from such echos.

48. In an automatic landing system for aircraft as defined in claim 47 wherein said means responsive to target acquisition causes the steering means to steer the beam successively through increasing numbers of overlapping beam positions as a function of target range and correspondingly to alter the prf of the transmitter means.

49. In an automatic landing system for aircraft, the combination of:
  a planar, phased array antenna capable of producing a pencil beam which may be steered;
  steering means for causing said antenna repetitively to point its beam stepwise successively through a fixed sequence of a large raster of beam positions;
  transmitter means for causing the antenna to transmit rf energy at a plurality of different frequencies covering a large frequency band at each of the beam positions to which the antenna means is pointed before the beam is steered stepwise to point to a next position in the large raster of beam positions;
  means for detecting and acquiring a plurality of targets and for determining their positions relative to the antenna means;
  means responsive to target acquisition and connected to said steering means for steering the beam successively through a small raster of beam positions, which may vary in size to cover an acquired target, before steering the beam stepwise to a next position in the fixed sequence of the large raster of beam positions; and
  means for receiving target echos from each small raster of beam target scintillation from such echos;
  said means responsive to target acquisition causing the steering means to adjust the size of each small raster of beam positions as an inverse function of range to the target in question and correspondingly to control the prf of the transmitter means during transmission over each small raster of beam positions.

50. In an automatic landing system for aircraft as defined in claim 49 wherein said means responsive to target acquisition also controls said steering means to scan the small rasters of beam positions at different rates based upon the ranges of the acquired targets.

51. In an automatic landing system for aircraft, the combination of:
  a planar, phased array antenna capable of producing a pencil beam which may be steered;
  steering means for causing said antenna repetitively to point its beam stepwise successively through a fixed sequence of a large raster of beam positions;
  transmitter means for causing the antenna to transmit rf energy at a plurality of different frequencies covering a large frequency band at each of the beam positions to which the antenna means is pointed before the beam is steered stepwise to point to a next position in the large raster of beam positions;
  means for detecting and acquiring a target and for determining position relative to the antenna means;
  means responsive to target acquisition and connected to said steering means for steering the beam successively through a small raster of beam positions covering an acquired target before steering the beam stepwise to a next position in the fixed sequence of the large raster of beam positions; and means for receiving target echos over said frequency band from each small raster of beam positions and for tracking the acquired target from successive scans of the small raster of beam positions with minimal error due to target scintillation from such echos;

said means responsive to target acquisition causing the steering means to adjust the size and the location of the small raster of beam positions within the large raster of beam positions from successive large raster scans and as an inverse function of range to the target in question and correspondingly to control the prf of the transmitter means during transmission over each small raster of beam positions.

52. In the method of automatically landing aircraft by skin tracking aircraft targets, the steps of:
  a. repetitively scanning a large raster of beam positions defining an acquisition window by steering an illuminating beam stepwise to point the beam successively through a fixed sequence of the large raster of beam positions;
  b. transmitting rf energy at a number of different frequencies at each beam position to cover a large band of frequencies before steering the beam stepwise to the next position in the fixed sequence of the large raster of beam positions; and
  c. acquiring a target aircraft and, in response thereto, superimposing target scans, each covering a small number of beam positions which overpaint the target aircraft, upon the repetitive scanning of step a so as to complete a target scan before steering the beam stepwise to said next position in the fixed sequence of the large raster while continuing transmission as in step b to cover a large band of frequencies at each beam position of the target scan.

53. In the method as defined in claim 52 wherein the small number of beam positions of a target scan is periodically increased as an inverse function of range to the target aircraft.

54. In the method as defined in claim 53 including the step of acquiring a plurality of target aircraft and superimposing target scans for each of the acquired aircraft targets as in step c.

55. In the method as defined in claim 54 wherein the frequency of target scans for each acquired aircraft target is periodically increased as an inverse function of range to the aircraft target in question.

* * * * *

UNITED STATES PATENT AND TRADEMARK OFFICE
CERTIFICATE OF CORRECTION

PATENT NO. : 4,675,678

DATED : June 23, 1987

INVENTOR(S) : Carl E. Klingenschmitt et al

It is certified that error appears in the above-identified patent and that said Letters Patent are hereby corrected as shown below:

Col. 15, line 19 - "42" should be ---424---.

Col. 16, line 9 - "lbss" should be ---loss---.

Col. 19, line 13 - "closed" should be ---close---.

Col. 19, line 15 - "skin tracking" should be ---skin-tracking---

Col. 19, line 45 - "claim 1" should be ---claim 12---.

Col. 20, line 20 - "references" should be ---referenced---.

Col. 22, line 30 - after "cover a", insert ---window---.

Col. 23, line 19 - "slteer" should be ---to steer---.

Col. 23, line 47 - "oapable" should be ---capable---.

Col. 24, line 34 - between "beam" and "target", insert ---positions and for tracking each target with minimal error due to---.

Col. 24, line 62 - "determining position" should be ---determining its position---.

UNITED STATES PATENT AND TRADEMARK OFFICE
CERTIFICATE OF CORRECTION

Page 2 of 2

PATENT NO. : 4,675,678
DATED : June 23, 1987
INVENTOR(S) : Carl E. Klingenschmitt et al It is certified that error appears in the above-identified patent and that said Letters Patent are hereby corrected as shown below:

Col. 17, line 25 - after "ing,", insert ---$\theta$---.

Col. 18, line 38 - "position" should be ---positions---.

Col. 18, line 64 - "position" should be ---positions---.

Col. 20, line 9 - "position" should be ---positions---.

Col. 20, line 48 - "position" should be ---positions---.

Col. 21, line 62 - "plane" should be ---phase---.

Signed and Sealed this

Twenty-second Day of December, 1987

Attest:

DONALD J. QUIGG

Attesting Officer

Commissioner of Patents and Trademarks